United States Patent
Lynn et al.

(10) Patent No.: US 8,071,210 B2
(45) Date of Patent: Dec. 6, 2011

(54) COVALENT ASSEMBLY OF ULTRATHIN POLYMERIC FILMS

(75) Inventors: David M. Lynn, Middleton, WI (US); Maren E. Buck, Fitchburg, WI (US); Jingtao Zhang, Lansdale, PA (US)

(73) Assignee: Wiscousin Alumni Research Foundation, Madison, WI (US)

( * ) Notice: Subject to any disclaimer, the term of this patent is extended or adjusted under 35 U.S.C. 154(b) by 708 days.

(21) Appl. No.: 12/248,788

(22) Filed: Oct. 9, 2008

(65) Prior Publication Data

US 2009/0170179 A1 Jul. 2, 2009

Related U.S. Application Data

(60) Provisional application No. 60/978,647, filed on Oct. 9, 2007.

(51) Int. Cl.
*G11B 5/64* (2006.01)

(52) U.S. Cl. .................. 428/336; 428/515; 428/520

(58) Field of Classification Search .................. 428/336, 428/515, 520
See application file for complete search history.

(56) References Cited

U.S. PATENT DOCUMENTS

| | | | |
|---|---|---|---|
| 4,304,705 A | 12/1981 | Heilmann et al. | |
| 4,451,619 A | 5/1984 | Heilmann et al. | |
| 4,485,236 A | 11/1984 | Rasmussen et al. | |
| 4,639,286 A | 1/1987 | Rasmussen et al. | |
| 4,871,824 A | 10/1989 | Heilmann et al. | |
| 4,981,933 A | 1/1991 | Fazio et al. | |
| 5,013,795 A | 5/1991 | Coleman et al. | |
| 5,039,813 A | 8/1991 | Fazio et al. | |
| 5,081,197 A | 1/1992 | Heilmann et al. | |
| 5,091,489 A | 2/1992 | Heilmann et al. | |
| 5,149,806 A | 9/1992 | Moren et al. | |
| 5,262,484 A * | 11/1993 | Coleman et al. | 525/204 |
| 5,266,446 A | 11/1993 | Chang et al. | |
| 5,336,742 A | 8/1994 | Heilmann et al. | |
| 5,344,701 A * | 9/1994 | Gagnon et al. | 428/304.4 |
| 5,419,806 A | 5/1995 | Huebner et al. | |
| 5,486,358 A | 1/1996 | Coleman et al. | |
| 5,567,422 A | 10/1996 | Greenwald | |
| 5,741,620 A | 4/1998 | Holmes et al. | |
| 5,837,751 A | 11/1998 | Jacobine et al. | |
| 6,245,922 B1 | 6/2001 | Heilmann et al. | |
| 6,291,216 B1 | 9/2001 | Muller et al. | |
| 6,379,952 B1 | 4/2002 | Rasmussen et al. | |

(Continued)

FOREIGN PATENT DOCUMENTS

WO    WO 2009/049092    *    4/2009

OTHER PUBLICATIONS

Ai et al. (Feb. 2003) "Biomedical Applications of Electrostatic Layer-by-Layer Nano-Assembly of Polymers, Enzymes, and Nanoparticles," *Cell Biochem. Biophys.* 39(1):23-43.

(Continued)

*Primary Examiner* — Bernard Lipman
(74) *Attorney, Agent, or Firm* — Greenlee Sullivan P.C.

(57) ABSTRACT

In one aspect, described herein are ultrathin films comprising an azlactone functionalized polymer and a primary amine functionalized polymer. Also described herein are ultrathin films including reactive, nonreactive, partially reactive/nonreactive, hydrophobic, hydrophilic, and mixed hydrophobic/hydrophilic ultrathin films. In another aspect, described herein are methods for making surface attached and freestanding ultrathin films.

78 Claims, 23 Drawing Sheets

U.S. PATENT DOCUMENTS

| | | | |
|---|---|---|---|
| 6,630,243 B2 * | 10/2003 | Valint et al. | 428/420 |
| 6,902,812 B2 * | 6/2005 | Valint et al. | 428/420 |
| 7,112,361 B2 | 9/2006 | Lynn et al. | |
| 7,332,546 B2 | 2/2008 | Fansler et al. | |
| 7,368,296 B2 | 5/2008 | Edwards et al. | |
| 7,413,607 B2 * | 8/2008 | Rakow et al. | 117/68 |
| 7,501,157 B2 * | 3/2009 | Mao et al. | 427/384 |
| 7,671,155 B2 * | 3/2010 | Shah et al. | 526/259 |
| 7,883,720 B2 * | 2/2011 | Lynn et al. | 424/450 |
| 7,947,716 B2 * | 5/2011 | Benson et al. | 514/367 |
| 2001/0025015 A1 | 9/2001 | Volker et al. | |
| 2001/0031839 A1 | 10/2001 | Muller et al. | |
| 2002/0150951 A1 | 10/2002 | Rasmussen et al. | |
| 2003/0049435 A1 | 3/2003 | Haddad et al. | |
| 2005/0003198 A1 * | 1/2005 | Haddad et al. | 428/411.1 |
| 2005/0027064 A1 | 2/2005 | Lynn et al. | |
| 2006/0051396 A1 | 3/2006 | Hamilton et al. | |
| 2006/0068204 A1 | 3/2006 | Rasmussen et al. | |
| 2006/0251701 A1 | 11/2006 | Lynn et al. | |
| 2007/0020469 A1 | 1/2007 | Wood et al. | |
| 2008/0002146 A1 * | 1/2008 | Stachowski et al. | 351/160 H |

OTHER PUBLICATIONS

Berg et al. (2006) "Controlled Drug Release from Porous Polyelectrolyte Multilayers," *Biomacromolecules* 7:357-364.

Bertrand et al. (Apr. 2000) "Ultrathin Polymer Coatings by Complexation of Polyelectrolytes at Interfaces: Suitable Materials, Structure and Properties," *Macromol. Rapid Comm.* 21(7):319-348.

Blacklock et al. (Jan. 2007) "Disassembly of Layer-by-Layer Films of Plasmid DNA and Reducible TAT Polypeptide," *Biomaterials* 28(1):117-124.

Boulmedais et al. (2003) "Buildup of Exponentially Growing Multilayer Polypeptide Films with Internal Secondary Structure," *Langmuir* 19(2):440-445.

Buck et al. (2007) "Layer-by-Layer Assembly of Reactive Ultrathin Films Mediated by Click-Type Reactions of Poly(2-Alkenyl Azlactone)s," *Adv. Mater.* 19(22):3951-3955.

Chen et al. (Mar. 2001) "Fabrication of a Covalently Attached Multilayer Film via In-Situ Reaction," *Macromol. Rapid Commun.* 22:311.

Chen et al. (2007) "Tunable Film Degradation and Sustained Release of Plasmid DNA from Cleavable Polycation/Plasmid DNA Multilayers under Reactive Conditions," *Small* 3(4):636-643.

Cho et al. (2003) "Polymeric Multilayer Films Comprising Deconstructable Hydrogen-Bonded Stacks Confined Between Electrostatically Assembled Layers," *Macromolecules* 36(8):2845-2851.

Decher, G. (Aug. 1997) "Fuzzy Nanoassemblies: Toward Layered Polymeric Multicomposites," *Science* 277:1232-1237.

De Geest et al. (Apr. 2006) "Intracellularly Degradable Polyelectrolyte Microcapsules," *Adv. Mater.* 18(8):1005-1009.

De Geest et al. (2007) "Release Mechanisms for Polyelectrolyte Capsules," *Chem. Soc. Rev.* 36:636-649.

Drtina et al. (1996) "Highly Cross-Linked Azlactone Functional Supports of Tailorable Polarity," *Macromolecules* 29(13):4486-4489.

Dubas et al. (2001) "Multiple Membranes from "True" Polyelectrolyte Multilayers," *J. Am. Chem. Soc.* 123(22):5368-5369.

Dubas et al. (2001) "Polyelectrlyte Multilayers Containing a Weak Polyacid: Construction and Deconstruction," *Macromolecules* 34(11):3736-3740.

Etienne et al. (2005) "Degradability of Polysaccharides Multilayer Films in the Oral Environment: An In Vitro and In Vivo Study," *Biomacromolecules* 6(2):726-733.

Feng et al. (Jul. 2006) "Fabrication of Robust Biomolecular Patters by Reactive Microcontact Printing on N-Hydroxysuccinimide Ester-Containing Polymer Films," *Adv. Funct. Mater.* 16(10):1306-1312.

Feng et al. (2005) "Reactive Thin Films as Platforms for the Immobilization of Biomolecules," *Biomacromolecules* 6(6):3243-3251.

Fredin et al. (2005) "Surface Analysis of Erosion Multilayered Polyelectrolyte Films: Nanometer-Scale Structure and Erosion Profiles," *Langmuir* 21:5803-5811.

Fredin et al. (2007) "Nanometer-Scale Decomposition of Ultrathin Multilayered Polyelectrolyte Films," *Langmuir* 23:2273-2276.

Groth et al. (2004) "Layer-by-Layer Deposition of Polyelectrolytes—A Versatile Tool for the In Vivo Repair of Blood Vessels," *Angew Chem. Int. Ed. Engl.* 43:926-928.

Guichard et al. (1998) "Reactive poly(2-vinyl-4,4-dimethyl-5-oxazolone) and poly [(2-vinyl-4,4-dimethyl-5-oxazolone)-co-(methyl methacrylate)]s. Synthesis, characterization and chemical modification with 4-methoxy-4'-(β-aminoethoxy) biphenyl," *Macromol. Chem. Phys.* 199:1657-1674.

Hammond, P.T. (2004) "Form and Function in Multilayer Assembly: New Applications at the Nanoscale," *Adv. Mater.* 16:1271-.

Heilmann et al. (Nov. 1, 2001) "Chemistry and Technology of 2-Alkenyl Azlactones," *J. Polym. Sci. A Polym. Chem.* 39(21):3655-3677.

Hiller et al. (2002) "Reversibly Erasable Nanoporous Anti-Reflection Coatings from Polyelectrolyte Multilayers," *Nat. Mater.* 1:59-63.

International Search Report and Written Opinion Corresponding to International Application No. PCT/US08/79417, Mailed Dec. 22, 2008.

Jerome et al. (2003) "Preparation of Reactive Surfaces by Electrografting," *Chem. Commun.* 19:2500-2501.

Jewell et al. (2005) "Multilayered Polyelectrolyte Films Promote the Direct and Localized Delivery of DNA to Cells," *J. Control. Release* 106:214-223.

Jewell et al. (2008) "Multilayered Polyelectrolyte Assemblies as Platforms for the Delivery of DNA and Other Nucleic Acid-Based Therapeutics," *Adv. Drug Deliv. Rev.* 60:979-999.

Jewell et al. (2006) Release of Plasmin DNA from Intravascular Stents Coated with Ultrathin Multilayered Poly *Biomacromolecules* 7:2483-2491.

Jiang et al. (2007) "Degradable-Brushed pHEMA-pDMAEMA Synthesized ATRP and Click Chemistry for Gene Delivery," *Bioconjugate Chem.* 18(6):2077-2084.

Kolb et al. (Jun. 1, 2001) "Click Chemistry: Diverse Chemical Function from a Few Good Reactions," *Angew Chem. Int. Ed.* 40(11):2004-2021.

Lahann et al. (2002) Reactive Polymer Coatings: A Platform for Patterning Proteins and Mammalian Cells onto a Broad Range of Materials, *Langmuir* 18(9):3632-3638.

Lahann et al. (2003) "Reactive Polymer Coatings: A First Step Toward Surface Engineering of Microfluidic Devices," *Anal. Chem.* 75(9):2117-2122.

Lavalle et al. (2004) "Direct Evidence for Vertical Diffusion and Exchange Processes of Polyanions and Polycations in Polyelectrolyte Multilayer Films," *Macromolecules* 37(3):1159-1162.

Li et al. (2004) "Multilayer Biomimetics: Reversible Covalent Stabilization of a Nanostructured Biofilm," *Biomacromolecules* 5(5):1667-1670.

Liang et al. (2004) "Multilayer Assembly and Patterning of Poly(p-phenylenecinylene)s via Covalent Coupling Reactions," *Langmuir* 20(22):9600-9606.

Liu et al. (2008) "Polyelectrolyte Multilayers Fabricated from 'Charge-Shifting' Anionic Polymers: A New Approach to Controlled Film Disruption and the Release of Cationic Agents from Surfaces," *Soft Matter* 4:1688-1695.

Liu et al. (2005) "Charge-Shifting Cationic Polymers that Promote Self-Assembly and Self-Disassembly with DNA," *Macromolecules* 38:7907-7914.

Lu et al. (Feb. 2008) "Biodegradable Polycation and Plasmid ZDNA Multilayer Film for Prolonged Gene Delivery to Mouse Osteoblasts," *Biomaterials* 29(6):733-741.

Lvov et al. (1994) "Assembly of Thin Films by Means of Successive Deposition of Alternate Layers of DNA and Poly(allylamine)," *Macromolecules* 26(20):5396-5399.

Lynn, D.M. (2006) "Layers of Opportunity: Nanostructured Polymer Assemblies for the Delivery of Macromolecular Therapeutics," *Soft Matter.* 2:269-273.

Lynn, D.M. (2007) "Peeling Back the Layers: Controlled Erosion and Triggered Disassembly of Multilayered Polyelectrolyte Thin Films," *Adv. Mater.* 19:4118-4130.

Mathiowitz et al. (1987) "Polyanhydride Microspheres as Drug Carriers. I. Hot-Melt Microencapsulation," *J. Controlled Release* 5:13-22.

Mathiowitz et al. (1987) "Novel Microcapsules for Delivery Systems," *Reactive Polymers* 6:275-283.

Mathiowitz et al. (1988) "Polyanhydride Microspheres as Drug Carriers. II. Microencapsulation by Solvent Removal," *J. Appl. Polymer Sci.* 35:755-774.

Mendelsohn et al. (2006) "Fabrication of Microporous Thin Films from Polyelectrolyte Multilayers," *Langmuir* 16(11):5017-5023.

Nolte et al. (2004) "Creating Effective Refractive Index Gradients Within Polyelectrolyte Multilayer Films: Molecularly Assembled Rugate Filters," *Langmuir* 20(8):3304-3310.

Peyratout et al. (Jul. 19, 2004) "Tailor-Made Polyelectrolyte Microcapsules: From Multilayers to Smart Containers," *Angew. Chem. Int. Ed.* 43(29):3762-3783.

Picart et al. (Oct. 1, 2002) "Molecular Basis for the Explanation of the Exponential Growth of Polyelectrolyte Multilayers," *Proc. Nat. Acad. Sci. USA* 99(20):12531-12535.

Picart et al. (Nov. 2005) "Controlled Degradability of PolySaccharide Multilayer Films In Vitro and In Vivo," *Adv. Funct. Mater.* 15(11):1771-1780.

Ren et al. (Mar. 2006) "Construction and Enzymatic Degradation of Multilayered Poly-l-lysine/DNA Films," *Biomaterials* 27(7):1152-1159.

Ren et al. (2006) "Tunable DNA Release from Cross-Linked Ultrathin DNA/PLL Multilayered Films," *Bioconjugate Chem.* 17(1):77-83.

Richardson et al. (2001) "Polymeric System for Dual Growth Factor Delivery," *Nat. Biotechnol.* 19:1029-1034.

Richert et al. (2004) "Improvement of Stability and Cell Adhesion Properties of Polyelectrolyte Multilayer Films by Chemical Cross-Linking," *Biomacromolecules* 5(2):284-294.

Richert et al. (2004) "Layer by Layer Buildup of Polysaccharide Films: Physical Chemistry and Cellular Adhesion Aspects," *Langmuir* 20(2):448-458.

Schneider et al. (2007) "Multifunctional Polyelectrolyte Multilayer Films: Combining Mechanical Resistance, Biodegradability, and Bioactivity," *Biomacromolecules* 8(1):139-145.

Schneider et al. (2006) "Polyelectrolyte Multilayers with a Tunable Young's Modulus: Influence of Film Stiffness on Cell Adhesion," *Langmuir* 22(3):1193-1200.

Schoeler et al. (2003) "Growth of Multilayer Films of Fixed and Variable Charge Density Polyelectrolytes: Effect of Mutual Charge and Secondary Interactions," *Macromolecules* 36(14):5258-5264.

Schuler et al. (2001) "Decomposable Hollow Biopolymer-Based Capsules," *Biomacromolecules* 2:921-926.

Serizawa et al. (2002) "Thermoresponsive Ultrathin Hydrogels Prepared by Sequential Chemical Reactions," *Macromolecules* 35(6):2184-2189.

Such et al. (2006) "Assembly of Ultrathin Polymer Multilayer Films by Click Chemistry," *J. Am. Chem. Soc.* 128(29):9318-9319.

Sukhishvili et al. (2002) "Layered, Erasable Polymer Multilayers Formed by Hydrogen-Bonded Sequential Self-Assembly," *Macromolecules* 35(1):301-310.

Sukhishvili et al. (2000) "Layered, Erasable, Ultrathin Polymer Films," *J. Am. Chem. Soc.* 122(39):9550-9551.

Sukhishvili, S.A. (2005) "Responsive Polymer Films and Capsules via Layer-by-Layer Assembly," *Curr. Opin. Colloid. Interface Sci.* 10:37-44.

Sun et al. (2007) "Assembly of Multilayers Films Using Well-Defined, End-Labeled Poly (acrylic Acid): Influence of Molecular Weight on Exponential Growth in a synthetic Weak Polyelectrolyte System," *Langmuir* 23(16):8452-5459.

Sun et al. (2000) "Covalently Attached Multilayer Assemblies by Sequential Adsorption of Polycationic Diazo-Resins and Polyanionic Poly(acrylic acid)," *Langmuir* 16(10):4620-4624.

Tang et al. (2006) "Biomedical Applications of Layer-by-Layer Assembly: From Biomimetics to Tissue Engineering," *Adv. Mater.* 18(24):3203-3224.

Vazquez et al. (Nov. 27, 2002) "Construction of Hydrolytically-Degradable Thin Films Via Layer-by-Layer Deposition of Degradable Polyelectrolytes," *J. Am. Chem. Soc.* 124(47):13992-13993.

Wood et al. (2005) "Tunable Drug Release from Hydrolytically Degradable Layer-by-Layer Thin Films," *Langmuir* 21:1603-1609.

Wood et al. (2006) "Controlling Interlayer Diffusion to Achieve Sustained, Multi-Agent Delivery from Layer-by-Layer Films," *Proc. Nat. Acad. Sci. USA* 103:10207-10212.

Xie et al. (Jan. 5, 1999) "Design of Reactive Porous Polymer Supports for High Throughput Bioreactors: Poly(2-vinyl-4,4-dimethylazlactone-co-acrylamide-co-ethylene dimethacrylate) Monoliths," *Biotechnol. Bioeng.* 62(1):30-35.

Yang et al. (2004) "Mechanistic Study of the Anchoring Behavior of Liquid Crystals Supported on Metal Salts and Their Orientational Responses to Dimethyl Methylphosphonate," *J. Phys. Chem. B* 108(52):20180-20186.

Yang et al. (2002) "Micropatterning of Polymer Thin Films with pH-Sensitive and Cross-Linkable Hydrogen-Bonded Polyelectrolyte Multilayers," *J. Am. Chem. Soc.* 124(10):2100-2101.

Zelikin et al. (2006) "Disulfide Cross-Linked Polymer Capsules: En Route to Biodeconstructible Systems," *Biomacromolecules* 7(1):27-30.

Zhang et al. (2002) "Ways for fabricating stable layer-by-layer self assemblies: combined ionic self-assembly and post chemical reaction," *Colloid Surface A* 198:439-442.

Zhang et al. (2003) "Fabrication of Stable Hollow Capsules by Covalent Layer-by-Layer Self-Assembly," *Macromolecules* 36(11):4238-4240.

Zhang et al. (2006) "Structure/Property Relationships in Erodible Multilayered Films: Influence of Polycation Structure on Erosion Profiles and the Release of Anionic Polyelectrolytes," *Langmuir* 22:239-245.

Zhang et al. (2007) "Ultrathin Multilayered Films Assembled from 'Charge-Shifting' Cationic Polymers: Extended, Long-Term Release of Plasmid DNA from Surfaces," *Adv. Mater.* 19:4218-4223.

Zhang et al. (2007) "Multilayered Films Fabricated from Plasmid DNA and a Side-Chain Functionalized Poly(Beta-amino ester): Surface-Type Erosion and Sequential Release of Multiple Plasmid Constructs from Surfaces," *Langmuir* 23:11139-11146.

Zhang et al. (2006) Multilayered Films Fabricated from Combinations of Degradable Polyamines: Tunable Erosion and Release of Anionic Polyelectrolytes, *Macromolecules* 39:8928-8935.

Zhang et al. (2006) "Erosion of Multilayered Assemblies Fabricated from Degradable Polyamines: Characterization and Evidence in Support of a Mechanism that Involves Polymer Hydrolysis," *J. Poly. Sci. A Poly. Chem.* 44:5161-5173.

Zhang et al. (2004) "Multilayered Thin Films that Sustain the Release of Functional DNA under Physiological Conditions," *Langmuir* 20(19):8015-8021.

\* cited by examiner a)

b)

c)

a)

b)

c)

d)

e)

f)

COVALENT ASSEMBLY OF ULTRATHIN POLYMERIC FILMS

CROSS REFERENCE TO RELATED APPLICATION

This application claims priority under 35 U.S.C. §119(e) to U.S. Provisional Patent Application No. 60/978,647 filed on Oct. 9, 2007, which is hereby incorporated by reference in its entirety.

STATEMENT REGARDING FEDERALLY SPONSORED RESEARCH OR DEVELOPMENT

This invention was made with United States government support awarded by the following agencies: NIH EB002746. The United States government has certain rights in this invention.

BACKGROUND OF THE INVENTION

This invention is in the field of thin and ultrathin polymeric films. This invention relates generally to layer-by-layer assembly of ultrathin and reactive ultrathin films from polymeric materials.

Methods that permit the deposition or assembly of reactive polymer films on topologically complex substrates are useful for the patterning or chemical modification of surfaces of interest in a broad range of applications. Aqueous methods for the layer-by-layer deposition of oppositely charged polyelectrolytes on surfaces are used widely for the bottom-up assembly of nanostructured polymer films. These methods generally take advantage of multivalent weak interactions (e.g., electrostatic or hydrogen bonding interactions) between polyelectrolytes and oppositely charged surfaces and allow precise control over the thicknesses, compositions, and morphologies of thin films fabricated from a broad range of water soluble polymers. The stability of the resulting multilayered assemblies depends, in general, upon the nature of the multivalent interactions within the films and the extent to which these interactions can be disrupted by changes in environmental conditions (e.g., pH or ionic strength). It has been demonstrated that it is possible to enhance the stability of these supramolecular assemblies or modify their physical properties by chemically crosslinking the polyelectrolyte components of these films post fabrication.

Azlactone functionalized monomer and polymers are known in the art. For example, U.S. Pat. Nos. 4,304,705; 5,081,197; 5,091,489 and 5,039,813 disclose azlactone functionalized monomers and synthetic methods for making azlactone monomers. Methods of making azlactone functionalized polymers from azlactone functionalized monomers are disclosed, for example in U.S. Pat. No. 5,486,358. Azlactone functionalized copolymers are disclosed for example in U.S. Pat. No. 4,981,933. The disclosure of these Patents are herein incorporated by reference.

SUMMARY OF THE INVENTION

In one aspect, described herein are ultrathin polymer based and covalently crosslinked films. Also described herein are ultrathin films including layer-by-layer, reactive, nonreactive, partially reactive/nonreactive, reduced reactivity, hydrophobic, hydrophilic, and mixed hydrophobic/hydrophilic ultrathin films, among others. In another aspect, described herein are methods for making surface attached and freestanding ultrathin films.

A method for making an ultrathin film comprises the steps of exposing a surface to a first solution comprising a primary amine functionalized polymer, an alcohol functionalized polymer or a thiol functionalized polymer; and exposing the surface to a second solution comprising an azlactone functionalized polymer. In specific embodiments, exposing includes, but is not limited to: placing in a solution bath, spin coating, spraying or otherwise bringing a solution into contact with. In an embodiment, upon exposing the surface to the first solution, primary amine, alcohol, or thiol functionalized polymer molecules adhere to at least a portion of the surface. In an embodiment, upon exposing the surface to the second solution, azlactone functionalized polymer molecules react with at least a portion of the adhered primary amine, alcohol or thiol functionalized polymer molecules. In embodiments, the molecules can undergo chemical reactions, for example covalent bond forming reactions and/or crosslinking reactions.

For some embodiments of the methods described herein, the surface is further exposed to one or more solutions containing catalyst. In some embodiments the surface is exposed to a catalyst containing solution before, during and/or after each exposure of the surface to an alcohol and/or thiol functionalized polymers. In embodiments, the surface is exposed to a catalyst containing solution only once during the process of making an ultrathin film. In other embodiments, the surface is exposed to a catalyst more than once during the process of making an ultrathin film, for example after each exposure or after 10 exposures. In some embodiments, solutions containing alcohol and/or thiol functionalized polymers further include a catalyst. In other embodiments, solutions containing primary amine functionalized polymers and/or azlactone functionalized polymers further include a catalyst. Without wishing to be bound by any particular theory, it is believed that a catalyst is useful for some embodiments for promoting or increasing the rate of reaction of alcohol or thiol functional groups with azlactone functional groups. In a specific embodiment, a useful catalyst is 1,8-diazabicyclo[5,4,0]undec-7-ene (DBU). Other useful catalysts will be apparent to one of skill in the art.

In another embodiment, a method for making an ultrathin film comprises the steps of exposing a surface to a first solution comprising an azlactone functionalized polymer; and exposing the surface to a second solution comprising a primary amine functionalized polymer, an alcohol functionalized polymer or a thiol functionalized polymer. In an embodiment, upon exposing the surface to the first solution, azlactone functionalized polymer molecules adhere to at least a portion of the surface. In an embodiment, upon exposing the surface to the second solution, primary amine, alcohol, or thiol functionalized polymer molecules react with at least a portion of the adhered azlactone functionalized polymer molecules.

Useful surfaces include, but are not limited to: organic surfaces; inorganic surfaces; silicon surfaces; glass surfaces; metallic surfaces, for example gold or stainless steel surfaces; proteinaceous surfaces; polymer surfaces; hydrophobic or hydrophilic surfaces; planar surfaces; contoured surfaces; particle surfaces, for example nano- and micro-particle surfaces; surfaces of macroscopic objects; topographically patterned surfaces, for example nano- or micro-patterned surfaces; and/or any combination of these. Useful surfaces further include chemically modified surfaces, for example primary amine functionalized surfaces or azlactone functionalized surfaces. Such chemically modified surfaces can be prepared, for example, by adhering or covalently binding a primary amine functionalized polymer, an azlactone functionalized polymer, a primary amine and/or an azlactone to a surface. In another embodiment, a useful surface comprises a sacrificial, etchable or otherwise dissolvable layer. In an embodiment, a useful surface is a sacrificial surface, for example a sacrificial, etchable or otherwise dissolvable substrate. In another embodiment, the surface is patterned by microcontact printing, for example using methods known in the art.

A specific method of this aspect comprises repeating one or both of the exposing steps. In one embodiment, in a repeated step of exposing the surface to a solution containing a primary amine, alcohol or thiol functionalized polymer, at least a portion of the primary amine functionalized polymer molecules react with at least a portion of the azlactone functionalized polymer molecules on the surface. In another embodiment, in a repeated step of exposing the surface to a solution containing an azlactone functionalized polymer, at least a portion of the azlactone functionalized polymer molecules react with at least a portion of the primary amine, alcohol or thiol functionalized polymer molecules on the surface.

In a preferred embodiment, the exposing steps are each separated by one or more rinsing steps, for example rinsing with a substance substantially free of primary amines, a substance substantially free of alcohols, a substance substantially free of thiols, a substance substantially free of azlactones or any combination of these. In some embodiments, rinsing includes placing the surface in a rinse bath. Useful rinsing agents include, but are not limited to: organic solvents, acetone, DMSO, THF, DMF, $CH_2Cl_2$, $CHCl_3$, $CCl_4$ and/or any combination of these.

In another embodiment, a method of this aspect further comprises the step of lifting the ultrathin film from the surface. For embodiments including a surface comprising a sacrificial layer, the ultrathin film may be lifted from the surface by dissolving or etching the sacrificial layer. For embodiments include a surface comprising sacrificial substrate, the ultrathin film may be lifted from the surface by dissolving or etching the substrate. In a specific embodiment, the lifting step comprises mechanical removal of the ultrathin film from the surface.

Without wishing to be bound by any particular theory, it is believed that at least a portion of the azlactone functional groups of the azlactone functionalized polymer undergo covalent bond forming reactions with at least a portion of the primary amine, alcohol or thiol functional groups of the primary amine, alcohol or thiol functionalized polymer. When a portion of the azlactone or primary amine, alcohol or thiol functional groups remain unreacted within such a polymeric film they are available for subsequent or later reaction, for example with other primary amine, alcohol, thiol or azlactone moieties, including both polymeric and non-polymeric moieties. In some embodiments, such residual reactivity is utilized to further add additional material to the ultrathin film, for example by further exposing the ultrathin film to one or more solutions comprising a primary amine, alcohol or thiol functionalized polymer or an azlactone functionalized polymer. In some embodiments, such residual reactivity is utilized to functionalize the ultrathin film, for example to create a hydrophobic ultrathin film, a hydrophilic ultrathin film, an ultrathin film including fluorophores and/or an ultrathin film including other functionality.

A method of this aspect further comprises the step of exposing the surface to a primary amine containing solution, for example comprising a non-polymeric primary amine. Useful primary amine containing solutions include solutions comprising linear, branched, substituted and/or unsubstituted primary amines. Useful primary amine containing solutions include solutions comprising a hydrophobic primary amine, for example alkyl amines, alkenyl amines, aromatic amines, and/or any combination of these. In a specific embodiment, a hydrophobic primary amine containing solution comprises an alkyl amine, particularly a $C_1$-$C_{20}$ alkyl amine, and more specifically, hexylamine, decylamine, propylamine and/or any combination of these. In a specific embodiment, a primary amine containing solution comprises an Arginine-Glycine-Aspartic acid (RGD) sequence modified with a primary amine linker. In a specific embodiment, a primary amine containing solution comprises a hydrophilic primary amine, for example amino sugars, amino alcohols, amino polyols and/or any combination of these. Useful specific hydrophilic primary amines include, but are not limited to, glucamine, amine functionalized polyethylene glycol, amine functionalized ethylene glycol oligomers and/or any combination of these. Other useful primary amine containing solutions comprise a primary amine selected from the group consisting of: tetramethylrhodamine cadaverine, 7-diethylaminocoumarin-3-carboxylic acid hydrazide and any combination of these.

In a specific embodiment, only a portion of the surface is exposed to a primary amine containing solution. For example, droplets of a primary amine containing solution may be placed on the surface. In an embodiment, the surface is patterned by selectively exposing portions of the surface to the primary amine containing solution.

Azlactone functionalized polymers useful with aspects described herein include an azlactone functionalized polymer having a formula FX1:

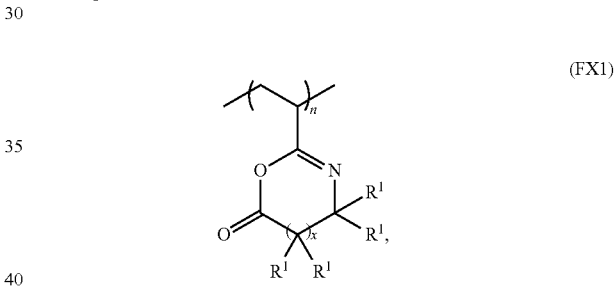

(FX1)

wherein x is an integer 0, 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted. For example, the azlactone functionalized polymer may be selected from the group consisting of:

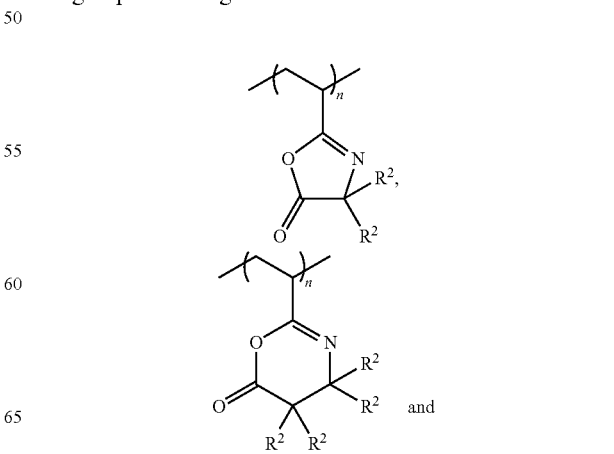

and

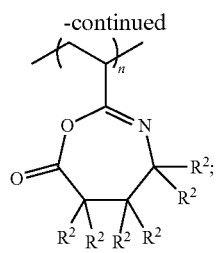

wherein each $R^2$ is independently selected from the group consisting of: a hydrogen, $C_1$-$C_{10}$ alkyl groups, $C_2$-$C_{10}$ alkenyl groups, $C_2$-$C_{10}$ alkynyl groups, $C_3$-$C_{10}$ cycloalkyl groups, $C_3$-$C_{10}$ heterocyclic groups, $C_6$-$C_{12}$ aryl groups, and $C_5$-$C_{12}$ heteroaryl groups, any of which may be substituted or unsubstituted.

Useful azlactone functionalized polymers further include those known in the prior art, for example poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly(2-vinyl-4-methyl-4-phenyl-2-oxazolin-5-one), poly(2-isopropenyl-4-benzyl-4-methyl-2-oxazolin-5-one), or poly(2-vinyl-4,4-dimethyl-1,3-oxazin-6-one). Useful azlactone functionalized polymers further include azlactone functionalized polyisoprenes and azlactone functionalized polybutadienes.

Useful azlactone functionalized polymers include copolymers, mixtures and blends of one or more azlactone functionalized polymers with one or more polymers. Useful azlactone functionalized polymers include polymers and copolymers of an azlactone monomer having a formula FX1a:

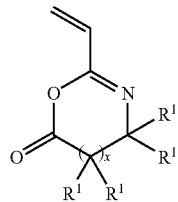

(FX1a)

wherein x and $R^1$ are as described above. For example, useful copolymers include random, alternating, tapered, block, and graft copolymers of an azlactone monomer of formula FX1a and another substituted or unsubstituted vinyl monomer (e.g., ethylene, styrene, isoprene, butadiene and/or methyl metharcylate). In a specific embodiment, a substituent of a substituted vinyl mer unit does not interfere with the reactivity of or react with the azlactone functional group of a copolymer mer unit. In a specific embodiment, a substituent of a substituted vinyl mer unit is not a primary amine containing group, an alcohol containing group and/or a thiol containing group.

Useful copolymers include copolymers of azlactone functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) or any combination of these.

Primary amine functionalized polymers are useful with aspects described herein. Primary amine functionalized polymers include, but are not limited to: poly(ethylene imine), polylysine, polyallylamine, poly(amidoamine) dendrimers, linear, hyperbranched, and dendritic polymers functionalized with primary amines and any combination or copolymers of these. Useful primary amine functionalized polymers include random, alternating, tapered, block, and graft copolymers of an primary amine containing monomer and another substituted or unsubstituted vinyl monomer (e.g., ethylene, styrene, isoprene, butadiene and/or methyl methacrylate). Useful primary amine containing polymers further include branched, hyperbranched or dendritic polymers containing multiple primary amine functional groups. Useful primary amine functionalized polymers further include those known in the prior art.

Useful copolymers for some embodiments include copolymers of primary amine functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) or any combination of these.

Alcohol functionalized polymers are useful with aspects described herein. Alcohol functionalized polymers include, but are not limited to: polyvinyl alcohol, poly hydroxy ethyl methacrylate, linear, hyperbranched, and dendritic polymers functionalized with hydroxyl groups and any combination or copolymers of these. Useful alcohol functionalized polymers include random, alternating, tapered, block, and graft copolymers of an alcohol containing monomer and another substituted or unsubstituted vinyl monomer (e.g., ethylene, styrene, isoprene, butadiene and/or methyl methacrylate). Useful alcohol containing polymers further include branched, hyperbranched or dendritic polymers containing multiple alcohol functional groups. Useful alcohol functionalized polymers further include those known in the prior art.

Useful copolymers for some embodiments include copolymers of alcohol functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) or any combination of these.

Thiol functionalized polymers are useful with aspects described herein. Thiol functionalized polymers include, but are not limited to: poly(methacrylic acid) functionalized with cysteamine, linear, hyperbranched, and dendritic polymers functionalized with thiol groups and any combination or copolymers of these. Preparation of Poly(Methacrylic Acid) Functionalized with Cysteamine is Described by A. N. Zelikin, J. F. Quinn, and F. Caruso in Biomacromolecules 2006, 7, 27-30, which is herein incorporated by reference. Useful thiol functionalized polymers include random, alternating, tapered, block, and graft copolymers of a thiol containing monomer and another substituted or unsubstituted vinyl monomer (e.g., ethylene, styrene, isoprene, butadiene and/or methyl methacrylate). Useful thiol containing polymers further include branched, hyperbranched or dendritic polymers containing multiple thiol functional groups. Useful thiol functionalized polymers further include those known in the prior art.

Useful copolymers for some embodiments include copolymers of thiol functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) or any combination of these.

In another aspect, methods are provided for preventing cells or proteins from adhering to surface. A specific method of this aspect comprises the steps of: exposing a surface to a first solution comprising a first polymer selected from the group consisting of a primary amine functionalized polymer, an alcohol functionalized polymer and a thiol functionalized polymer; exposing the surface to a second solution comprising an azlactone functionalized second polymer; and exposing the surface to a third solution comprising a non-polymeric hydrophilic primary amine, for example a hydrophilic primary amine selected from the group consisting of glucamine, amine functionalized polyethylene glycol, amine functionalized ethylene glycol oligomers and any combination of these. A specific method of this aspect further comprises repeating one or more times the steps of exposing the surface to a first solution comprising a first polymer selected from the group consisting of a primary amine functionalized polymer, an alcohol functionalized polymer and a thiol functionalized polymer and exposing the surface to a second solution comprising an azlactone functionalized second polymer.

In another aspect, methods are provided for promoting cells or proteins adhesion to a surface. A specific method of this aspect comprises the steps of: exposing a surface to a first solution comprising a first polymer selected from the group consisting of a primary amine functionalized polymer, an alcohol functionalized polymer and a thiol functionalized polymer; exposing the surface to a second solution comprising an azlactone functionalized second polymer; exposing the surface to a cell or protein. Another method of this aspect further comprises the step of exposing the surface to a hydrophobic primary amine, for example a primary amine selected from the group consisting of: hexylamine, decylamine, propylamine and any combination of these. Another method of this aspect further comprises the step of exposing the surface to an Arginine-Glycine-Aspartic acid (RGD) sequence modified with a primary amine linker. A specific method of this aspect further comprises repeating one or more times the steps of exposing the surface to a first solution comprising a first polymer selected from the group consisting of a primary amine functionalized polymer, an alcohol functionalized polymer and a thiol functionalized polymer and exposing the surface to a second solution comprising an azlactone functionalized second polymer before exposing the surface to a cell or protein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 6a shows an image of a film treated with a fluorophore and subsequently imaged after soaking in DMSO for one hour at 37° C.

FIG. 6b shows an image of a film treated with a fluorophore and subsequently imaged after soaking in DMSO at 37° C. for 6 hours.

FIGS. 6c and 6d show images of an identical film that was pre-treated by reaction with propylamine prior to treatment with a solution of amine functionalized fluorophore. The image in FIG. 6c was acquired after soaking the film in DMSO for one hour at 37° C. The image in FIG. 6d was acquired after soaking the film in DMSO for six hours at 37° C.

FIG. 12d show an image of the film peeled from the silicon surface in water using tweezers.

DETAILED DESCRIPTION OF THE INVENTION

Figure 1:
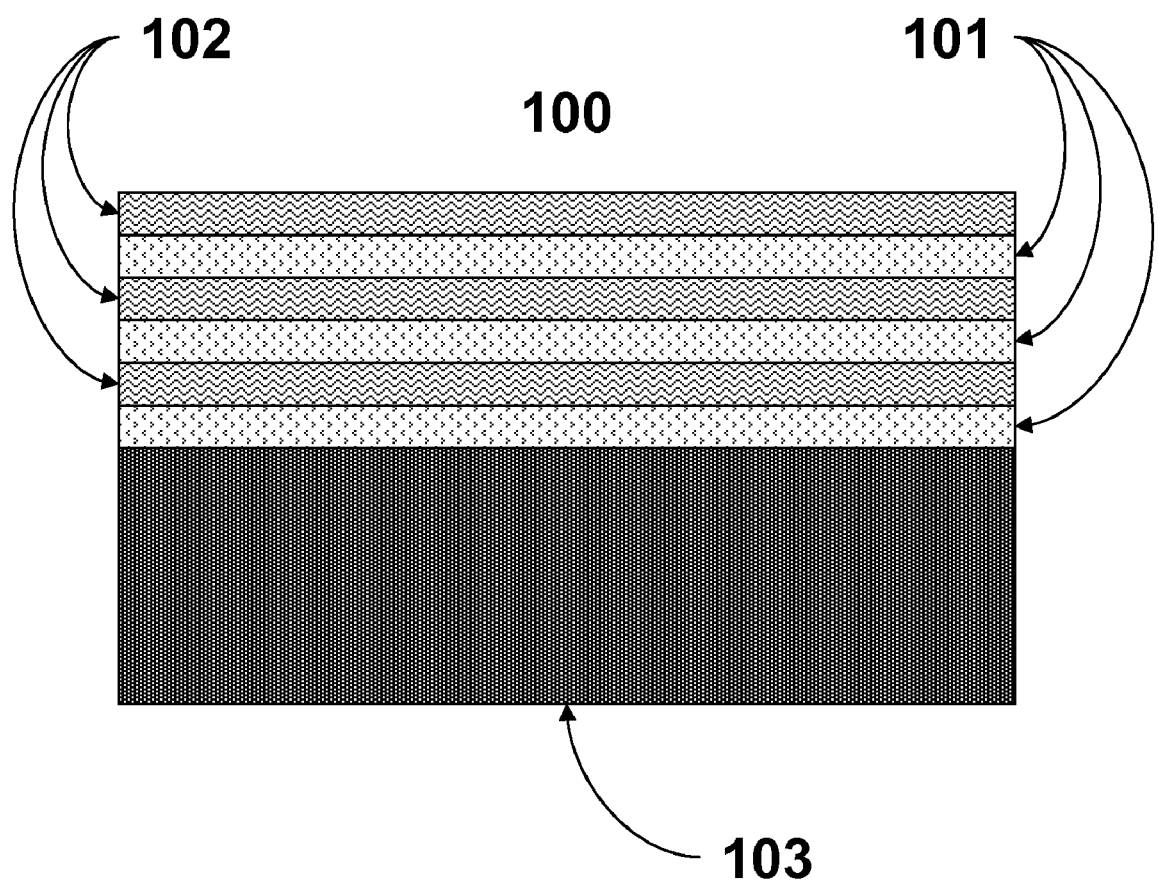
FIG. 1 provides a schematic illustration of a surface bound layer-by-layer ultrathin film comprising a primary amine functionalized polymer and an azlactone functionalized polymer.

In general the terms and phrases used herein have their art-recognized meaning, which can be found by reference to standard texts, journal references and contexts known to those skilled in the art. The following definitions are provided to clarify their specific use in the context of the invention.

"Polymer" refers to a macromolecule composed of repeating structural units connected by covalent chemical bonds or the polymerization product of one or more monomers.

"Mer", "mer unit" or "monomer residue" refers to a portion of a polymer derived from a single reactant molecule. For example, an ethylene mer unit has the general formula —$CH_2CH_2$—, a propylene mer unit has the general formula —$CHCH_3CH_2$— and a 2-vinyl-4,4-dimethylazlactone mer unit has the general formula:

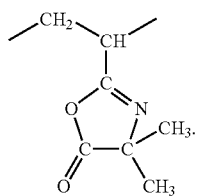

"Homopolymer" refers to a polymer consisting essentially of a single type of repeating mer unit.

"Copolymer" refers to a polymer consisting essentially of two or more mer units and is inclusive of random, block, alternating, segmented, graft, tapered and other copolymers.

"Functionalized polymer" refers to a polymer in which the individual mer units are substituted with a specific functional group. In terms of a copolymer, at least one of the two or more mer units is substituted with a specific functional group. Functionalized polymer as used herein does not include a polymer having the specific functional group exclusively at a terminal position. Polyvinyl chloride is one example of a halogen functionalized polymer; poly(2-vinyl-4,4-dimethylazlactone) is one example of an azlactone functionalized polymer; poly(ethylene imine) is one example of a primary amine functionalized polymer.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. Cyclic alkyl groups include those having one or more rings. Cyclic alkyl groups include those having a 3-, 4-, 5-, 6-, 7-, 8-, 9- or 10-member carbon ring and particularly those having a 3-, 4-, 5-, 6-, or 7-member ring. The carbon rings in cyclic alkyl groups can also carry alkyl groups. Cyclic alkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxyl group is an alkyl group linked to oxygen and can be represented by the formula R—O—.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cyclic alkenyl groups include those having one or more rings. Cyclic alkenyl groups include those in which a double bond is in the ring or in an alkenyl group attached to a ring. Cyclic alkenyl groups include those having a 3-, 4-, 5-, 6-, 7-, 8-, 9- or 10-member carbon ring and particularly those having a 3-, 4-, 5-, 6- or 7-member ring. The carbon rings in cyclic alkenyl groups can also carry alkyl, alkenyl or other groups. Cyclic alkenyl groups can include bicyclic and tricyclic alkyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogens replaced with one or more fluorine atoms.

Alkynyl groups include straight-chain, branched and cyclic alkynyl groups. Alkynyl groups include those having 1, 2 or more triple bonds and those in which two or more of the triple bonds are conjugated triple bonds. Alkynyl groups include those having from 2 to 20 carbon atoms. Alkynyl groups include small alkynyl groups having 2 to 3 carbon atoms. Alkynyl groups include medium length alkynyl groups having from 4-10 carbon atoms. Alkynyl groups include long alkynyl groups having more than 10 carbon atoms, particularly those having 10-20 carbon atoms. Cyclic alkynyl groups include those having one or more rings. Cyclic alkynyl groups include those in which a triple bond is in the ring or where an alkynyl group is attached to a ring. Cyclic alkynyl groups include those having a 3-, 4-, 5-, 6-, 7-, 8-, 9- or 10-member carbon ring and particularly those having a 3-, 4-, 5-, 6- or 7-member ring. The carbon rings in cyclic alkynyl groups can also carry alkyl, alkenyl or other groups. Cyclic alkynyl groups can include bicyclic and tricyclic groups. Alkynyl groups are optionally substituted with one or more non-hydrogen substituents. Substituted alkynyl groups include among others those which are substituted with alkyl or aryl groups, which groups in turn can be optionally substituted. Alkynyl groups include acetyl, methylacetyl, 1-pentynyl, and 2-pentynyl, all of which are optionally substituted. Substituted alkynyl groups include fully halogenated or semihalogenated alkynyl groups, such as alkynyl groups having one or more hydrogens replaced with one or more fluorine atoms, chlorine atoms, bromine atoms and/or iodine atoms. Substituted alkynyl groups include fully fluorinated or semifluorinated alkynyl groups, such as alkynyl groups having one or more hydrogens replaced with one or more fluorine atoms.

Aryl groups include groups having one or more 5-member, 6-member or more-member aromatic or heteroaromatic rings. Aryl groups can contain one or more fused aromatic rings. Heteroaromatic rings can include one or more N, O, or S atoms in the ring. Heteroaromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl having one or more hydrogens replaced with one or more fluorine atoms, chlorine atoms, bromine atoms and/or iodine atoms.

Optional substitution of any alkyl, alkenyl and aryl groups includes substitution with one or more of the following substituents: halogens, —CN, —COOR, —OR, —COR, —OCOOR, —CON(R)$_2$, —OCON(R)$_2$, —N(R)$_2$, —NO$_2$, —SR, —SO$_2$R, —SO$_2$N(R)$_2$ or —SOR groups. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for alkyl, alkenyl and aryl groups include, among others:

—COOR where R is a hydrogen or an alkyl group or an aryl group and more specifically where R is methyl, ethyl, propyl, butyl, or phenyl groups all of which are optionally substituted;

—COR where R is a hydrogen, or an alkyl group or an aryl groups and more specifically where R is methyl, ethyl, propyl, butyl, or phenyl groups all of which groups are optionally substituted;

—CON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—OCON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—N(R)$_2$ where each R, independently of each other R, is a hydrogen, or an alkyl group, acyl group or an aryl group and more specifically where R is methyl, ethyl, propyl, butyl, or phenyl or acetyl groups all of which are optionally substituted; or R and R can form a ring which may contain one or more double bonds;

—SR, —SO$_2$R, or —SOR where R is an alkyl group or an aryl groups and more specifically where R is methyl, ethyl, propyl, butyl, phenyl groups all of which are optionally substituted; for —SR, R can be hydrogen;

—OCOOR where R is an alkyl group or an aryl groups;

—SO$_2$N(R)$_2$ where R is a hydrogen, an alkyl group, or an aryl group and R and R can form a ring;

—OR where R=H, alkyl, aryl, or acyl; for example, R can be an acyl yielding —OCOR* where R* is a hydrogen or an alkyl group or an aryl group and more specifically where R* is methyl, ethyl, propyl, butyl, or phenyl groups, all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups, and methoxyphenyl groups, particularly 4-methoxyphenyl groups.

As to any of the above groups which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

In one aspect, provided herein are ultrathin films. In a specific embodiment, an ultrathin film of this aspect comprises an azlactone functionalized polymer and a primary amine functionalized polymer. In a specific embodiment, an ultrathin film of this aspect comprises an azlactone functionalized polymer and an alcohol functionalized polymer. In a specific embodiment, an ultrathin film of this aspect comprises an azlactone functionalized polymer and a thiol functionalized polymer. In contrast to ionic polymer films known in the prior art, in embodiments, the ultrathin film is not held together by electrostatic forces. Without wishing to be bound by any particular theory, it is believed that at least a portion of the functional groups of the azlactone functionalized polymer undergo reactions with at least a portion of the primary amine, alcohol or thiol functional groups of the primary amine, alcohol or thiol functionalized polymer, for example a chemical reaction such as covalent bond forming and/or crosslinking reactions. It is also believed that when a portion of the azlactone, primary amine, alcohol or thiol functional groups remain unreacted within such a polymeric film they are available for subsequent or later reaction, for example with other primary amine, alcohol, thiol or azlactone moieties, including both polymeric and non-polymeric moieties. In an embodiment, in an ultrathin film at least a portion of the primary amine, alcohol or thiol functionalized polymer undergoes a chemical reaction with at least a portion of the azlactone functionalized polymer. For some embodiments, an ultrathin film further comprises a catalyst. Without wishing to be bound by any particular theory, it is believed that a catalyst is useful for some embodiments for promoting or increasing the rate of reaction of alcohol or thiol functional groups with azlactone functional groups. In a specific embodiment, a useful catalyst is 1,8-diazabicyclo[5,4,0]undec-7-ene (DBU).

The ultrathin films described herein have a variety of uses. For example, the ultrathin films described herein are useful for providing hydrophobic, hydrophilic, lipophilic, fluorescent or other functional surface coatings. Further, ultrathin film embodiments described herein are useful for preventing cell adhesion to surfaces, promoting cell adhesion to surfaces, promoting protein adhesion to surfaces, preventing protein adhesion to surfaces, as well as freestanding thin films functionalized in these ways.

In an embodiment, a hydrophilic ultrathin film of this aspect comprises a primary amine, alcohol or thiol functionalized polymer, an azlactone functionalized polymer and a hydrophilic primary amine, wherein a portion of the azlactone functionalized polymer is reacted with at least a portion of the primary amines, alcohols or thiols of the primary amine, alcohol or thiol functionalized polymer and a portion of the azlactone functionalized polymer is reacted with at least a portion of the hydrophilic primary amine.

In an embodiment, a hydrophobic ultrathin film of this aspect comprises a primary amine functionalized polymer, an azlactone functionalized polymer and a hydrophobic primary amine, wherein a portion of the azlactone functionalized polymer is reacted with at least a portion of the primary amines of the primary amine functionalized polymer and a portion of the azlactone functionalized polymer is reacted with at least a portion of the hydrophobic primary amine.

In an embodiment, a mixed hydrophilic-hydrophobic ultrathin film of this aspect comprises a primary amine functionalized polymer, an azlactone functionalized polymer, a hydrophilic primary amine and a hydrophobic primary amine, wherein a portion of the azlactone functionalized polymer is reacted with at least a portion of the primary amines of the primary amine functionalized polymer, a portion of the azlactone functionalized polymer is reacted with at least a portion of the hydrophilic primary amine and a portion of the azlactone functionalized polymer is reacted with at least a portion of the hydrophobic primary amine.

In a specific embodiment, an ultrathin film is a layer-by-layer film. Such a layer-by-layer film is schematically illustrated in FIG. 1, which shows a surface attached ultrathin film 100 comprising multiple primary amine functionalized polymer layers 101 and multiple azlactone functionalized polymer layers 102 positioned on a surface of substrate 103. In an embodiment, the layers of a layer-by-layer film are prepared by a series of alternating exposing steps. In some embodiments, an ultrathin film comprises a single bilayer, for example a bilayer comprising a layer of a primary amine functionalized polymer and a layer of an azlactone functionalized polymer. In other embodiments, an ultrathin film comprises multiple bilayers, for example two or more bilayers. For some embodiments, the number of bilayers of the film is not particularly limited and may, for example, be greater than 50 bilayers or greater than 100 layers. In specific embodiments, an ultrathin film has a thickness selected from the range of 1 nm to 100 μm, preferably 5 nm to 50 μm, or more preferably 10 nm to 10 μm. For some embodiments, the thickness of the film is not particularly limited and may, for example, be greater than 100 μm.

Figure 2A:
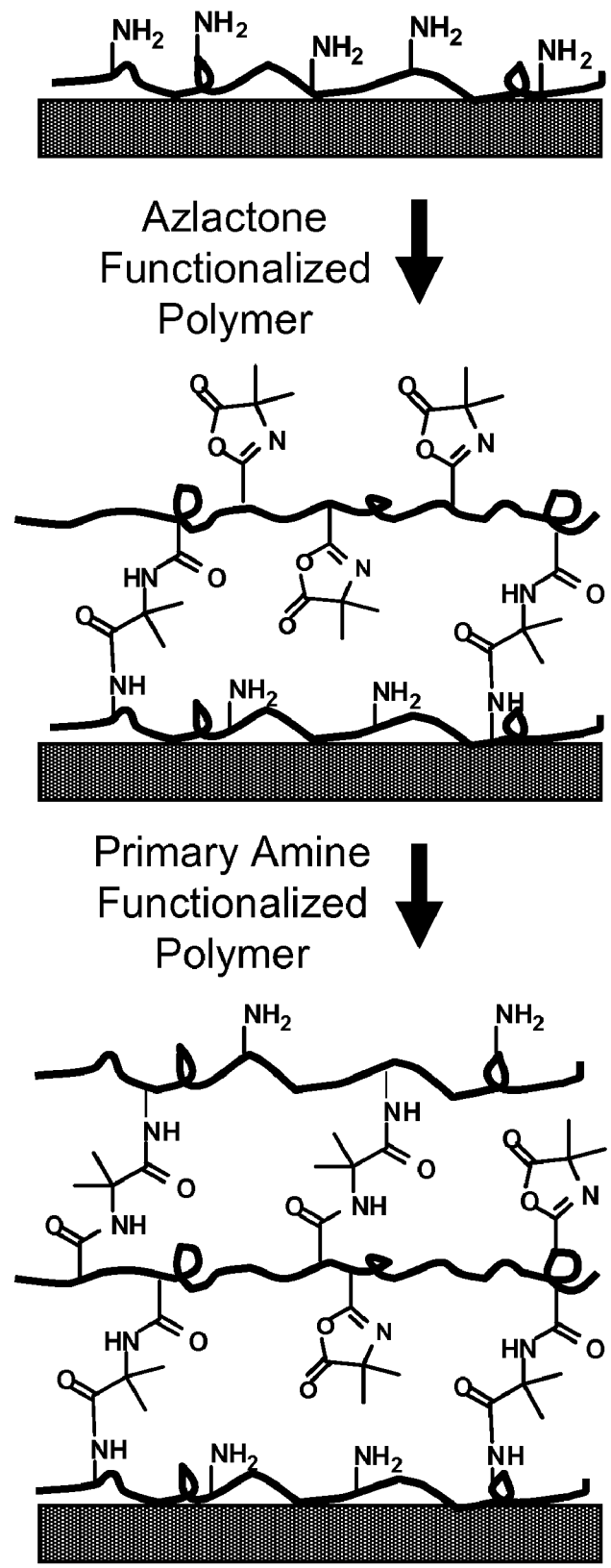
FIG. 2A provides a schematic illustration of formation of a layer-by-layer ultrathin film on a surface.

FIG. 2A illustrates formation of a layer-by-layer film, in one embodiment, beginning with a primary amine functionalized polymer on the surface of a substrate. Exposure to an azlactone functionalized polymer forms a second layer over the primary amine functionalized polymer layer. Further exposure to a primary amine functionalized polymer forms a third layer over the azlactone functionalized polymer. In an embodiment, further layers can be added in sequence in this manner.

In an embodiment, the azlactone functionalized polymer of an ultrathin film has a formula FX1:

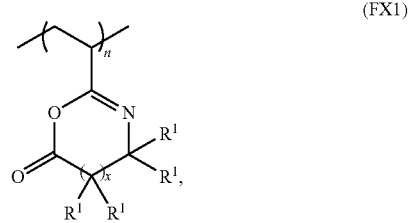

(FX1)

wherein x is an integer 0, 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted. For example, the azlactone functionalized polymer may be selected from the group consisting of:

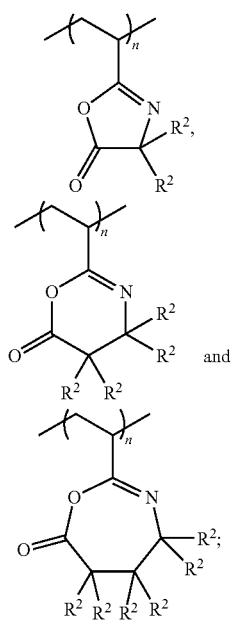

wherein each $R^2$ is independently selected from the group consisting of: a hydrogen, $C_1$-$C_{10}$ alkyl groups, $C_2$-$C_{10}$ alkenyl groups, $C_2$-$C_{10}$ alkynyl groups, $C_3$-$C_{10}$ cycloalkyl groups, $C_3$-$C_{10}$ heterocyclic groups, $C_6$-$C_{12}$ aryl groups, and $C_5$-$C_{12}$ heteroaryl groups, any of which may be substituted or unsubstituted.

Useful azlactone functionalized polymers include those known in the prior art, for example poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly(2-vinyl-4-methyl-4-phenyl-2-oxazolin-5-one), poly(2-isopropenyl-4-benzyl-4-methyl-2-oxazolin-5-one), or poly(2-vinyl-4,4-dimethyl-1,3-oxazin-6-one). Useful azlactone functionalized polymers further include azlactone functionalized polyisoprenes and azlactone functionalized polybutadienes.

Useful azlactone functionalized polymers include copolymers, mixtures and blends of one or more azlactone functionalized polymers with one or more polymers. Useful azlactone functionalized polymers include polymers and copolymers of an azlactone monomer having a formula FX1a:

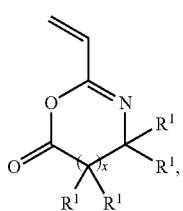

(FX1a)

wherein x and $R^1$ are as described above. For example, useful copolymers include random, alternating, tapered, block, and graft copolymers of an azlactone monomer of formula FX1a and another substituted or unsubstituted vinyl monomer (e.g., ethylene, styrene, isoprene, butadiene and/or methyl methacrylate). In a specific embodiment, a substituent of a substituted vinyl mer unit does not interfere with the reactivity of or react with the azlactone functional group of a copolymer mer unit. In a specific embodiment, a substituent of a substituted vinyl mer unit is not a primary amine containing group, an alcohol containing group and/or a thiol containing group.

Useful copolymers include copolymers of azlactone functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) or any combination of these.

In some embodiments, the percentage of azlactone functionalized mer units in a copolymer is selectively adjusted, for example to selectively control the amount of crosslinking in a film comprising an azlactone functionalized copolymer. As used herein, percent functionalized mer units refers to the number of mer units out of 100 mer units of a copolymer that are functionalized with a specific functional group. In a specific embodiment, an azlactone functionalized copolymer contains about 1% azlactone functionalized mer units. In a specific embodiment, an azlactone functionalized copolymer contains about 99% azlactone functionalized mer units. In other specific embodiments, an azlactone functionalized copolymer contains 10%, 20%, 40%, 50%, 60%, 70%, 80% or 90% azlactone functionalized mer units.

Without wishing to be bound to any theory, it is believed that in an ultrathin film comprising an azlactone functionalized copolymer having less than 100% azlactone functionalized mer units fewer azlactone moieties are available for crosslinking reactions and thus fewer crosslinking reactions will occur when compared to an ultrathin film comprising an azlactone functionalized homopolymer or copolymer having 100% azlactone functionalized mer units.

In an embodiment, the primary amine functionalized polymer of an ultrathin film includes, but is not limited to, a primary amine functionalized polymer selected from the group consisting of: poly(ethylene imine), polylysine, polyallylamine, poly(amidoamine) dendrimers, linear, hyperbranched, and dendritic polymers functionalized with primary amines, any combination of these and any copolymers of these. Primary amine functionalized polymers useful for some embodiments include random, alternating, tapered, block, and graft copolymers of an primary amine containing monomer and another substituted or unsubstituted vinyl monomer (e.g., ethylene, styrene, isoprene, butadiene and/or methyl methacrylate). Primary amine functionalized polymers useful for some embodiments further include branched, hyperbranched or dendritic polymers containing multiple primary amine functional groups. Useful primary amine functionalized polymers further include those known in the prior art.

Primary amine functionalized copolymers useful for some embodiments include copolymers of primary amine functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) and/or any combination of these.

In an embodiment, the alcohol functionalized polymer of an ultrathin film includes, but is not limited to, an alcohol functionalized polymer selected from the group consisting of:

polyvinyl alcohol, poly hydroxy ethyl methacrylate, dendrimers, linear, hyperbranched, and dendritic polymers functionalized with hydroxy groups, any combination of these and any copolymers of these. Alcohol functionalized polymers useful for some embodiments include random, alternating, tapered, block, and graft copolymers of an alcohol containing monomer and another substituted or unsubstituted vinyl monomer (e.g., ethylene, styrene, isoprene, butadiene and/or methyl methacrylate). Alcohol functionalized polymers useful for some embodiments further include branched, hyperbranched or dendritic polymers containing multiple alcohol functional groups. Useful alcohol functionalized polymers further include those known in the prior art.

Alcohol functionalized copolymers useful for some embodiments include copolymers of alcohol functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) and/or any combination of these.

In an embodiment, the thiol functionalized polymer of an ultrathin film includes, but is not limited to, a thiol functionalized polymer selected from the group consisting of: poly(methacrylic acid) functionalized with cysteamine, dendrimers, linear, hyperbranched, and dendritic polymers functionalized with thiol groups, any combination of these and any copolymers of these. Thiol functionalized polymers useful for some embodiments include random, alternating, tapered, block, and graft copolymers of a thiol containing monomer and another substituted or unsubstituted vinyl monomer (e.g., ethylene, styrene, isoprene, butadiene and/or methyl methacrylate). Thiol containing polymers useful for some embodiments further include branched, hyperbranched or dendritic polymers containing multiple thiol functional groups. Useful thiol functionalized polymers further include those known in the prior art.

Thiol functionalized copolymers useful for some embodiments include copolymers of thiol functionalized polymers and polyolefins, poly(alkyls), poly(alkenyls), poly(ethers), poly(esters), poly(imides), polyamides, poly(aryls), poly(heterocycles), poly(urethanes), poly($\alpha,\beta$-unsaturated carboxylic acids), poly($\alpha,\beta$-unsaturated carboxylic acid derivatives), poly(vinyl esters of carboxylic acids), poly(vinyl halides), poly(vinyl alkyl ethers), poly(N-vinyl compounds), poly(vinyl ketones), poly(vinyl aldehydes) and/or any combination of these.

Figure 2B:
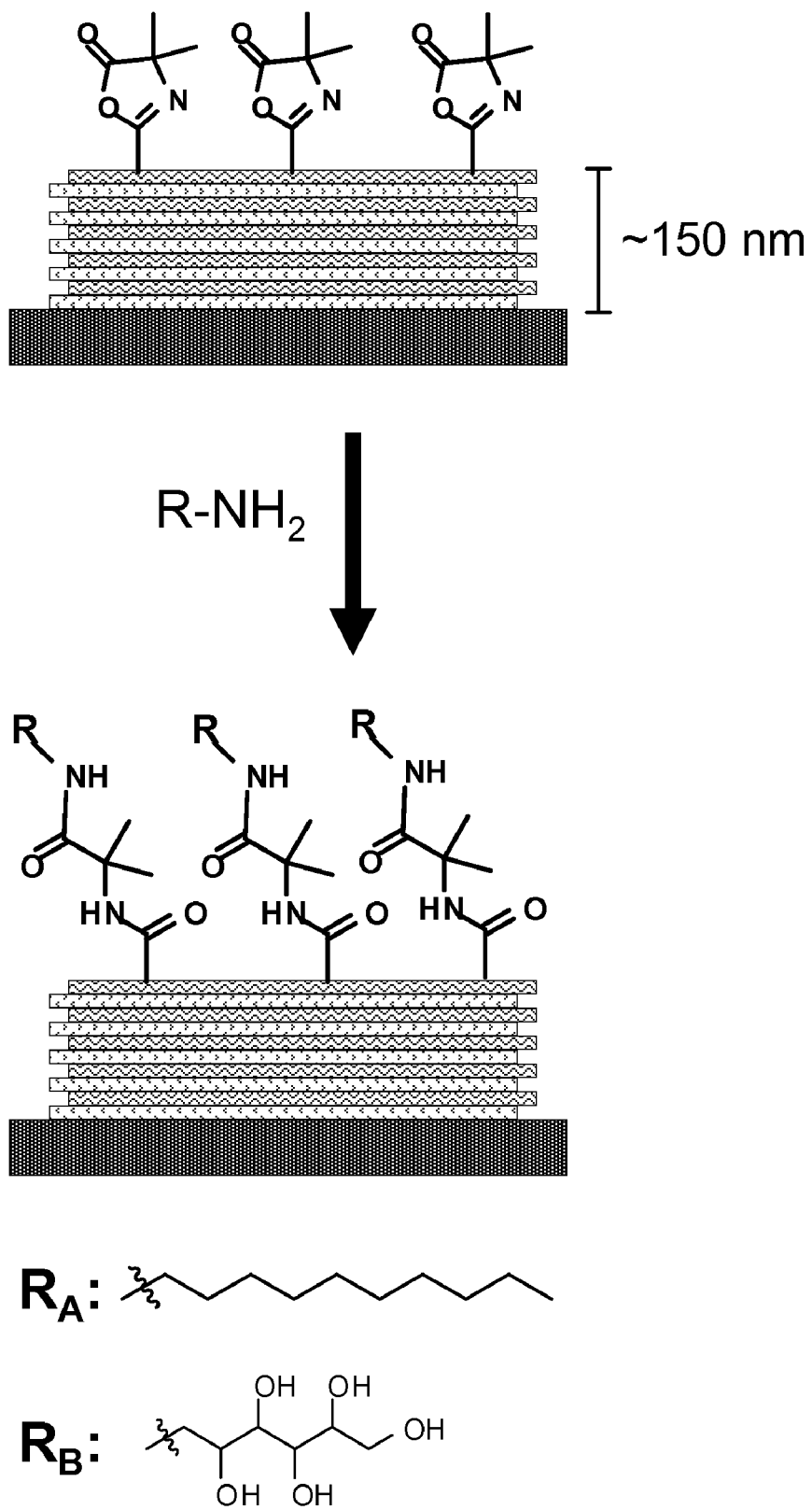
FIG. 2B provides a schematic illustration of functionalization of an ultrathin film by reaction with a primary amine.

For some embodiments, it may be desirable to fully or partially react any residual azlactone moieties of an ultrathin film. In an embodiment, an ultrathin film further comprises a primary amine. Without wishing to be bound by any particular theory, it is believed that at least a portion of unreacted azlactone groups of the azlactone functionalized polymer in an ultrathin film undergo a reaction with a primary amine included in an ultrathin film, for example a chemical reaction such as a covalent bond forming reaction. FIG. 2B illustrates post-fabrication modification of an ultrathin film by reaction with a primary amine (R—HN$_2$), for example where R$_A$—NH$_2$ is decylamine or R$_B$—NH$_2$ is glucamine. Useful primary amines include linear, branched, substituted and/or unsubstituted primary amines Such primary amines can, for example, impart desirable functionality to an ultrathin film such as hydrophobicity, hydrophilicity, amphiphilicity, lipophilicity, fluorescence and/or other functionality. In a specific embodiment, the primary amine is selected from the group consisting of hydrophobic primary amines, hydrophilic primary amines, amphiphilic primary amines, lipophilic primary amines and any combination of these.

In an embodiment, the primary amine is selected from the group consisting of: alkyl amines, alkenyl amines, aromatic amines and any combination of these. In embodiments, the primary amine is a $C_1$-$C_{20}$ alkyl amine. In specific embodiments, the primary amine is selected from the group consisting of: hexylamine, decylamine, propylamine and any combination of these. In a specific embodiment, the primary amine is Arginine-Glycine-Aspartic acid (RGD).

In an embodiment, the primary amine is selected from the group consisting of: amino sugars, amino alcohols, amino polyols and any combination of these. In specific embodiments, the primary amine is selected from the group consisting of: glucamine, amine functionalized polyethylene glycol, amine functionalized ethylene glycol oligomers and any combination of these.

In other embodiments, the primary amine is selected from the group consisting of: glutamine, cysteine, tetramethylrhodamine cadaverine, 7-diethylaminocoumarin-3-carboxylic acid hydrazide and any combination of these.

In some embodiments, an ultrathin film is attached to a surface, for example a surface comprising a material selected from the group consisting of inorganic surface, glass, silicon, metals, gold, stainless steel, organic surfaces, proteinaceous surfaces, and teflon. In a specific embodiment, the surface includes a sacrificial, etchable or otherwise dissolvable layer. In a specific embodiment, the surface comprises the surface of a sacrificial, etchable or otherwise dissolvable substrate. In other embodiments, an ultrathin film is not surface bound; that is, the ultrathin film is freestanding.

In specific embodiments, an ultrathin film comprises an azlactone functionalized polymer, for example having a formula FX1, and a polymer selected from the group consisting of: poly(ethylene imine); polylysine; polyallylamine; poly(amidoamine) dendrimers; linear, hyperbranched, and dendritic polymers functionalized with primary amines; polyvinyl alcohol; poly hydroxy ethyl methacrylate; dendrimers, linear, hyperbranched, and dendritic polymers functionalized with hydroxy groups; poly(methacrylic acid) functionalized with cysteamine; dendrimers, linear, hyperbranched, and dendritic polymers functionalized with thiol groups; any copolymer of these; and any combination of these.

Example 1

Layer-by-Layer Assembly of Reactive Ultrathin Films Mediated by 'Click'-Type Reactions of Poly(2-Alkenyl Azlactone)s This example describes a layer-by-layer approach to the assembly of covalently-crosslinked ultrathin films that makes use of fast and efficient 'click'-type interfacial reactions between poly(2-alkenyl azlactone)s and appropriately functionalized polyamines. In contrast to conventional, aqueous methods for the layer-by-layer fabrication of multilayered assemblies composed of polyelectrolytes, fabrication of these materials occurs in organic solvents and is driven by rapid interfacial formation of covalent bonds during assembly. These methods permit precise, nanometer-scale control over the thicknesses and compositions of covalently crosslinked thin films. In addition, this example shows that it is possible to chemically tailor the properties of surfaces coated with these ultrathin films post fabrication by exploiting the accessibility and reactivity of residual 'spring-loaded' azlactone functionality. These results suggest the basis of methods for the post-fabrication modification of curved or topologically complex surfaces coated with multilayered films and the patterning or passivation of surfaces with chemical or biological functionality of interest in the contexts of catalysis, medicine, and other areas of biotechnology.

It has been demonstrated that it is possible to enhance the stability of ionic polyelectrolyte supramolecular assemblies or modify their physical properties by chemically crosslinking the polyelectrolyte components of these films postfabrication, and that it is possible to forego entirely the use of supramolecular interactions to drive film assembly, and that the formation of covalent bonds between polymers with mutually reactive organic functionality can be sufficient to drive the fabrication of chemically crosslinked multilayered films. Of particular relevance to this example, the covalent layer-by-layer assembly of azide- and alkyne-functionalized poly(acrylic acid) derivatives using a copper sulfate-catalyzed 'click'-type reaction in aqueous media was recently reported.

This example demonstrates that polymers decorated with azlactone functionality react rapidly, quantitatively, and in the absence of a leaving group, with a broad range of functional nucleophiles. For example, poly(2-vinyl-4,4-dimethylazlactone) (1) has been demonstrated to react rapidly (and in the absence of a catalyst) with primary amines to yield substituted poly(acrylamide)s (Eq 1):

Equation 1

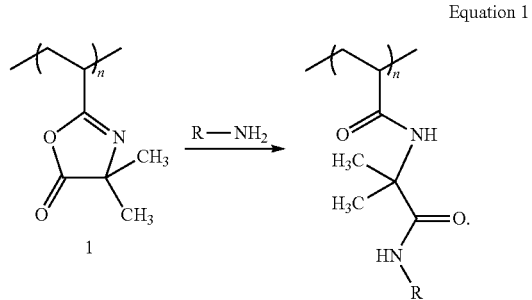

These reactions proceed with many of the characteristics and practical advantages of conventional 'click'-type organic reactions. Owing to the fast and selective nature of this ring-opening reaction, polymer 1 has been investigated as a 'spring-loaded', reactive template for the synthesis of side chain functionalized poly(acrylamide)s and the fabrication of porous supports for the immobilization of proteins. The reactivity of polymer 1 is thus exploited to drive the covalent, layer-by-layer assembly of reactive thin films using polymers functionalized with primary amines.

Figure 3:
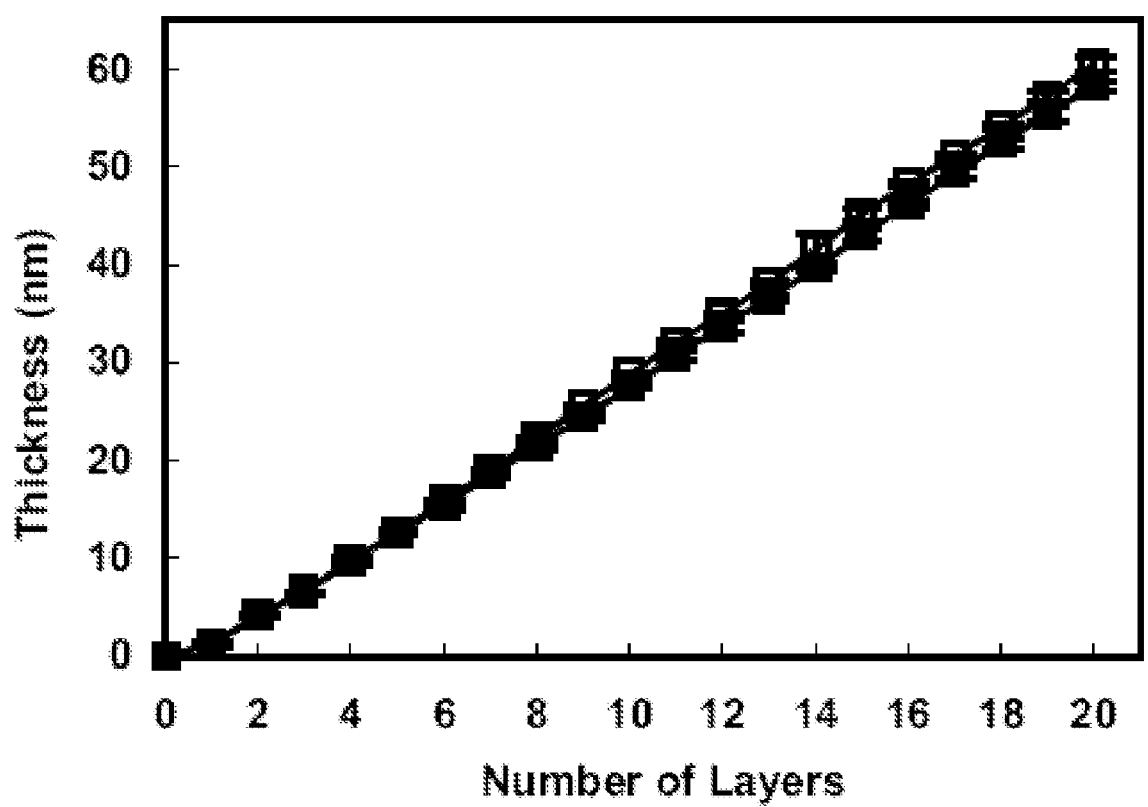
FIG. 3 provides data showing ellipsometric thickness versus the number of polymer bilayers for two identical films deposited on a silicon substrate.

To evaluate this approach, experiments were conducted using polymer 1, branched poly(ethylene imine) (PEI), and an alternate dipping procedure similar to that used for the assembly of polyelectrolyte-based films in aqueous media. All films used in these initial studies were deposited on planar silicon substrates to permit characterization of film thicknesses and growth profiles using ellipsometry. Alternate and repetitive dipping of these substrates into dilute organic solutions of polymer 1 or PEI (in acetone; 20 mM with respect to polymer repeat units) for one minute resulted in the stepwise growth of ultrathin polymer films. FIG. 3 shows a plot of the optical thickness versus the number of 1/PEI layers (hereafter referred to as 'bilayers') for two films deposited on silicon substrates.

Figure 4:
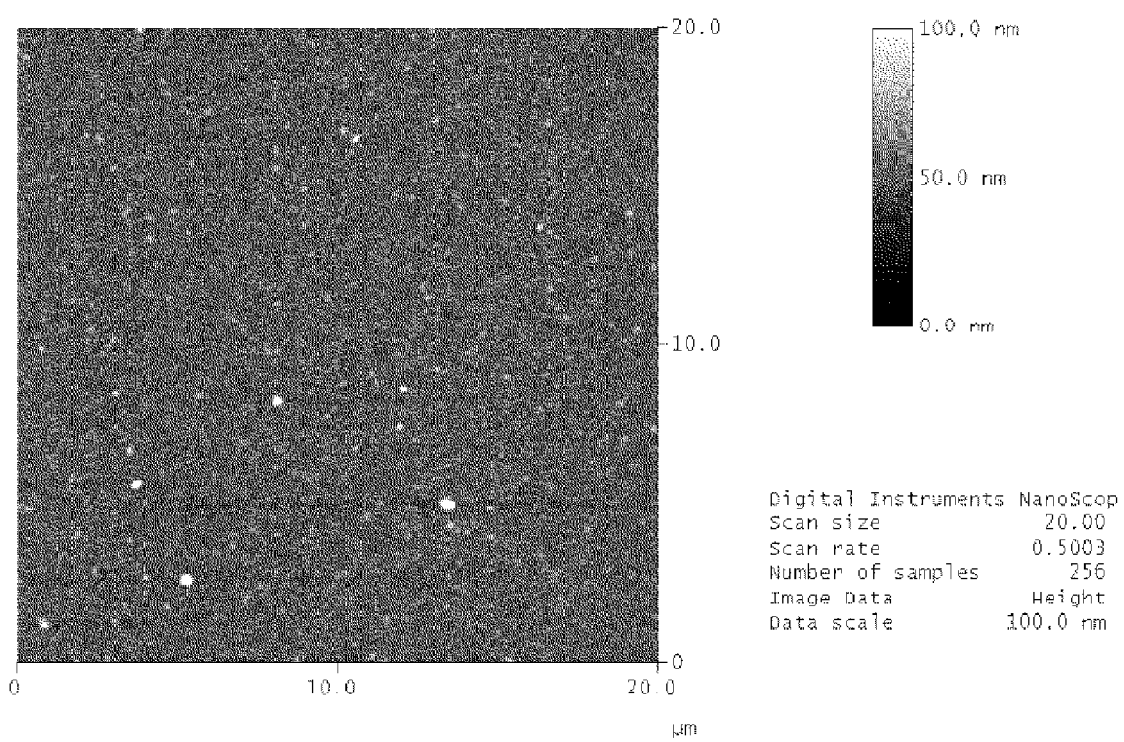
FIG. 4 provides an atomic force microscopy image (20 µm×20 µm) of a azlactone polymer/poly(ethylene imine) film 10 bilayers thick deposited on a silicon substrate.

Inspection of FIG. 3 reveals film thickness to increase as a linear function of the number of bilayers deposited, resulting in films ~60 nm thick after the deposition of 10 bilayers. Subsequent experiments demonstrated that the deposition of each successive layer of polymer 1 or PEI occurred rapidly; experiments conducted using dipping times as short as five seconds yielded films with thicknesses and growth profiles that did not vary measurably from those shown in FIG. 3 (data not shown). Polymer 1/PEI films were smooth and uniform on the micrometer scale, as determined by atomic force microscopy ($R_{rms}$=~4 nm; see FIG. 4) and over larger length scales, as suggested by the small error associated with the thickness measurements shown in FIG. 3. Control experiments using silicon substrates dipped repetitively into solutions of polymer 1 only (or, alternatively, into solutions of PEI only) did not result in film growth. These results demonstrate that the growth profiles shown in FIG. 3 reflect the stepwise and alternating deposition of ultrathin layers of polymer 1 and PEI, as observed for the layer-by-layer assembly of multilayered films fabricated using oppositely charged polyelectrolytes in water.

Figure 5:
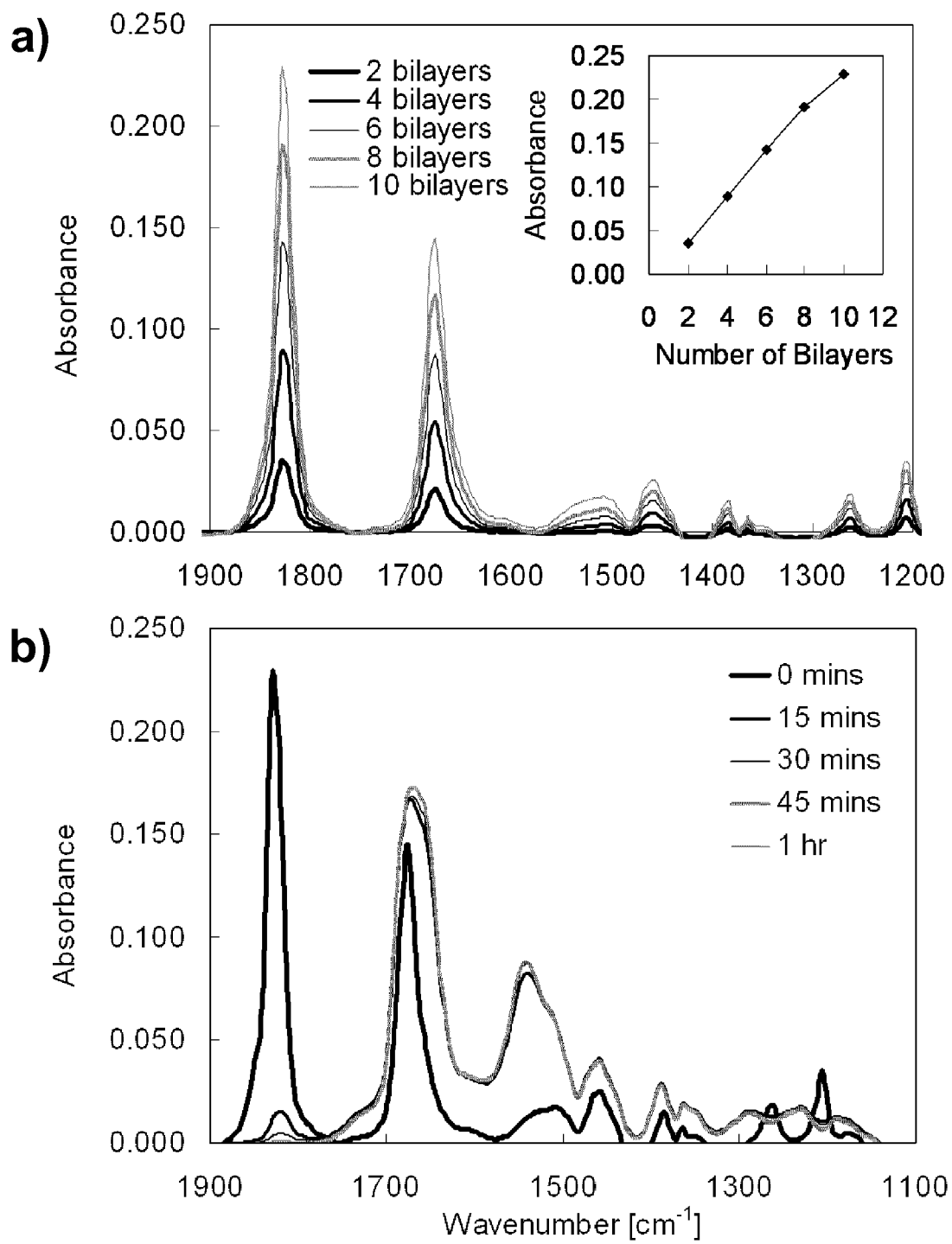
FIG. 5a provides data showing PM-IRRAS spectra of an azlactone polymer/poly(ethylene imine) ultrathin film as a function of the number of layers deposited. The inset illustrates absorbance of the peak at 1828 cm$^{-1}$ versus the number of layers deposited.
FIG. 5b provides data showing PM-IRRAS spectra acquired for a 10-bilayer (140 nm thick) azlactone functionalized polymer/poly(ethylene imine) film as a function of time soaked in a solution of propylamine at 37° C.

Fabrication of polymer 1/PEI films on gold-coated silicon substrates permitted characterization of the growth and chemical structures of these materials using reflective infrared (IR) spectroscopy. FIG. 5a shows changes in the carbonyl region of the IR spectrum of a polymer 1/PEI film as a function of the number of bilayers deposited, as characterized using polarization modulation infrared reflectance-absorbance spectroscopy (PMIRRAS). Inspection of these data reveals a strong absorbance peak at 1828 cm$^{-1}$ corresponding to the carbonyl in the azlactone group of polymer 1. The magnitude of this peak increases as a linear function of the number of layers of 1/PEI deposited (see inset in FIG. 5a), consistent with the linear increases in optical thickness shown in FIG. 3. Further inspection of this image reveals the presence of a second strong absorbance peak at 1677 cm$^{-1}$. The frequency of this second peak corresponds to that reported for both the C=N functionality in the azlactone ring, as well as that reported for the amide carbonyl peak formed upon reaction of polymer 1 with primary amines (as described below). The overlap of these two peaks prevents unambiguous spectroscopic observation of new amide bonds formed during layer-by-layer fabrication. However, the results of the fabrication and control experiments described above and the stability of these films upon extended exposure to organic solvents (described below), when combined, suggest that the assembly of polymer 1/PEI films is driven by reactions of the azlactone functionality of polymer 1 with the primary amine functionality of PEI at each step of the alternate dipping procedure.

The data in FIG. 5a demonstrate that a significant amount of the azlactone functionality in polymer 1 remains unreacted after layer-by-layer deposition with PEI. We conducted a series of experiments to determine whether this residual, 'spring-loaded' azlactone functionality was accessible for further chemical reactions and, subsequently, whether chemical functionalization of these films could be used to tailor the properties of these materials post-fabrication. FIG. 5b shows time-dependent changes in the carbonyl region of the IR spectrum of a 10-bilayer polymer 1/PEI film 140 nm thick that was soaked in a solution of the small nucleophile propylamine (50 mM, in DMSO). Inspection of these data reveals that the peak at 1828 cm$^{-1}$, which corresponds to unreacted azlactone functionality, decreases significantly after exposure to propylamine for 15 minutes, and that this peak disappears almost completely after 30 minutes. This decrease in azlactone functionality is accompanied by the appearance of an amide I peak at 1670 cm$^{-1}$ and a distinct amide II peak at 1544 cm$^{-1}$. These results demonstrate that the residual azlactone functionality in these films is accessible to propylamine and that propylamine reacts quantitatively and rapidly with the azlactone functionality throughout the bulk of the thin film. These results also suggest approaches to post-fabrication blocking, patterning, or passivation of films containing residual azlactone functionality (as described below). These films did not dissolve or detach from their silicon substrates under the conditions used in these experiments; post-functionalization characterization of these films demonstrated increases in optical thickness of ~20 nm and small increases in surface roughness (Rrms ~8.5 nm) after reaction with propylamine. Reaction of polymer 1/PEI films with the more hydrophobic nucleophiles hexylamine or decylamine resulted in significant increases in the water contact angles of these films (e.g., from ~620 for an untreated polymer 1/PEI film to angles of 85° and 100° for films functionalized using hexylamine or decylamine, respectively). These results demonstrate that it is possible to tailor the physical properties (e.g., the hydrophobicity) of surfaces coated with these thin reactive films post-fabrication by treatment with functional hydrophobic nucleophiles.

Figure 6A:
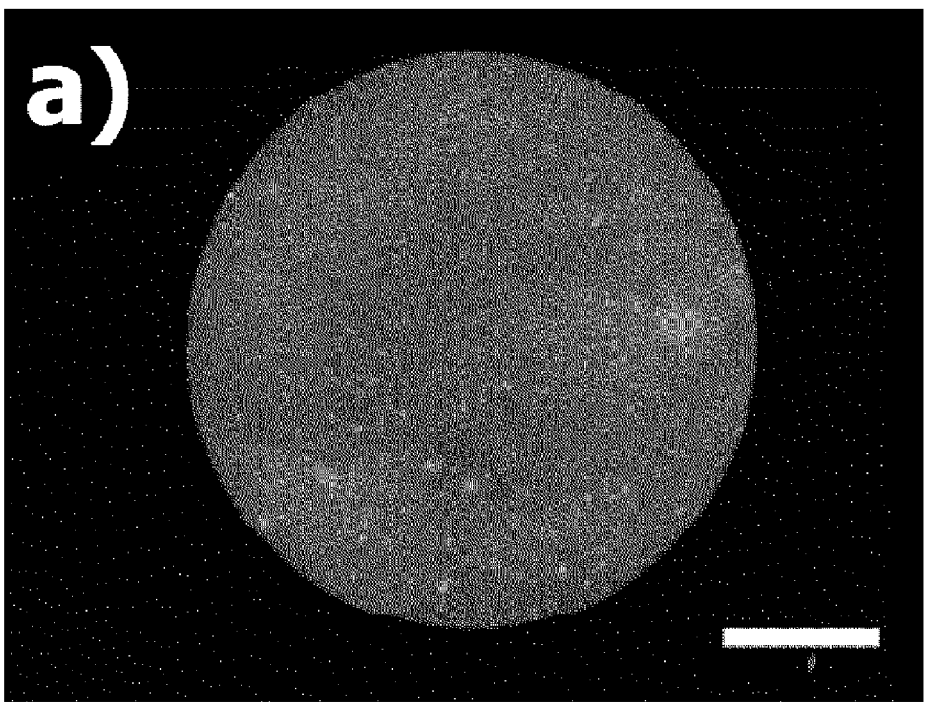
FIGS. 6a-d illustrate fluorescence micrographs of azlactone functionalized polymer/poly(ethylene imine) films (~320 nm thick) treated with drops of a concentrated solution of an amine-functionalized fluorophore (tetramethylrhodamine cadaverine).
Figure 6B:
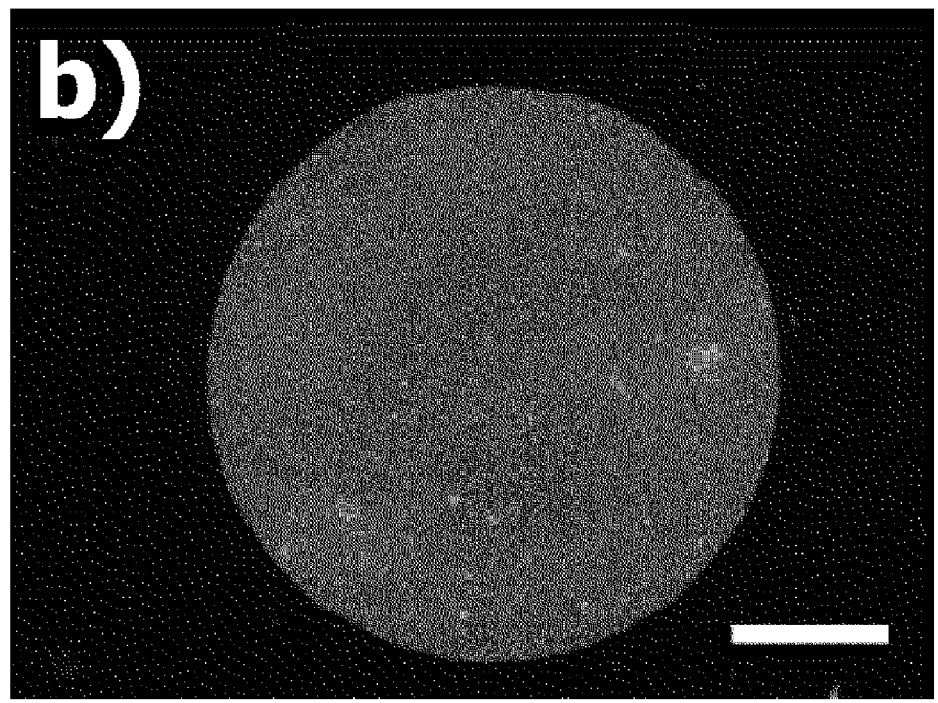
Figure 6C:
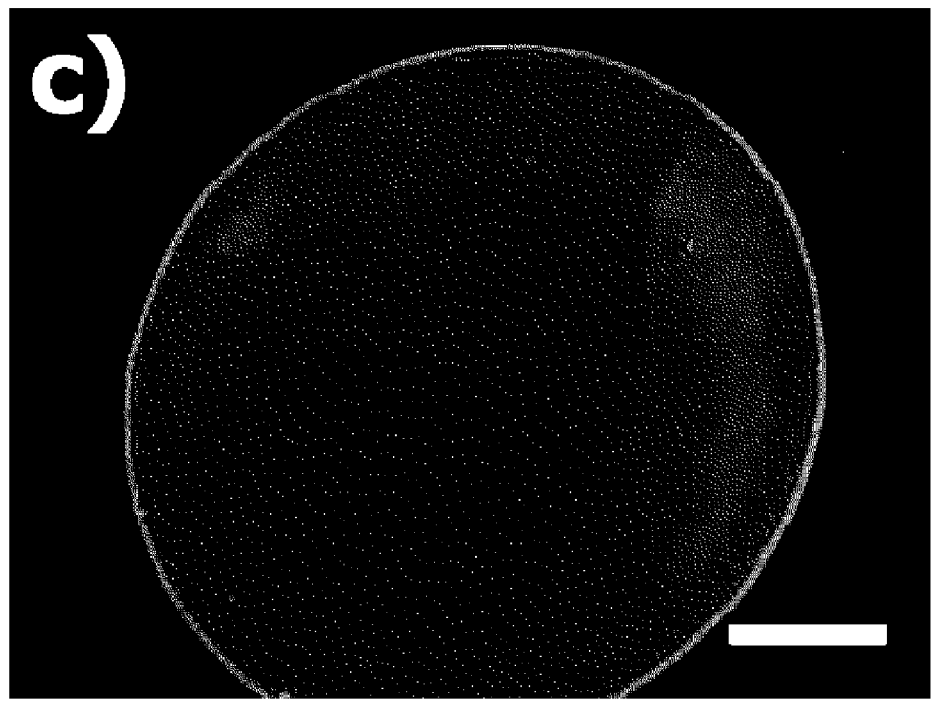
Figure 6D:
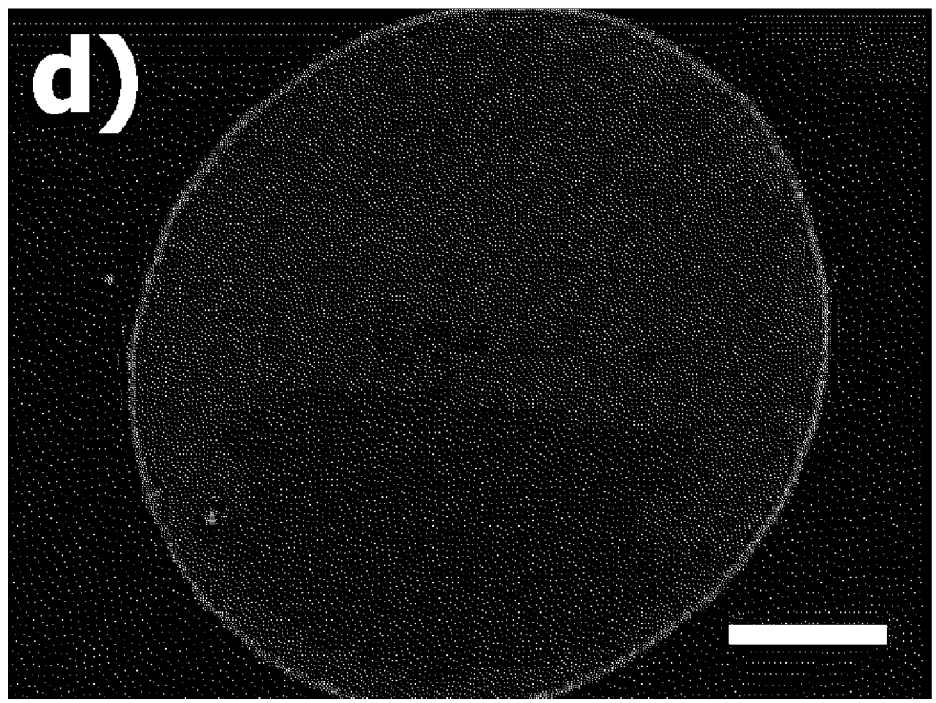
Figure 6E:
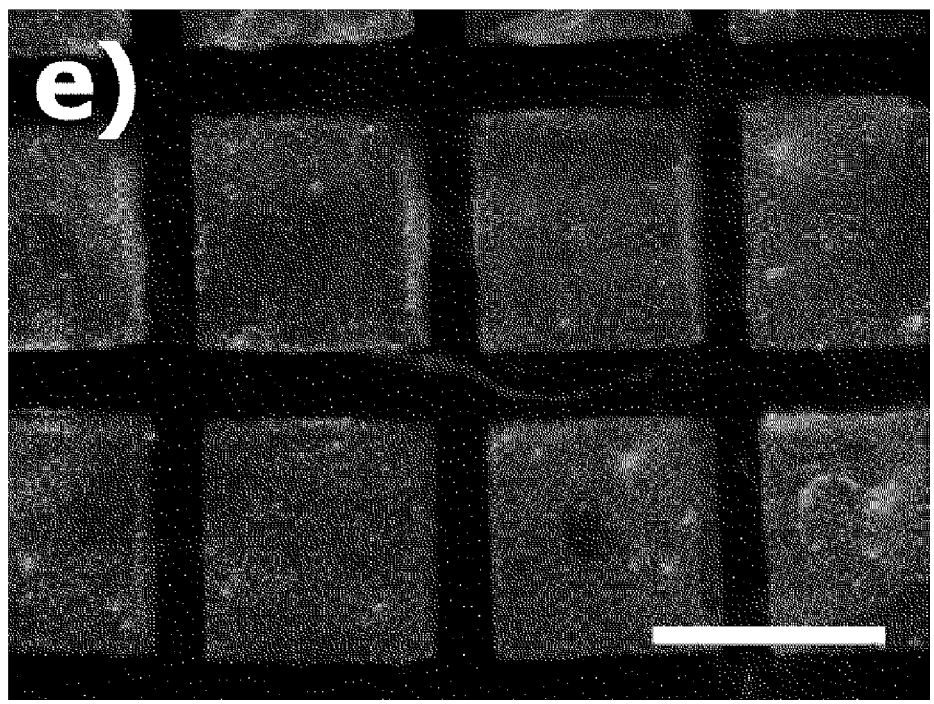
FIG. 6e shows an image of an azlactone functionalized polymer/poly(ethylene imine) film (~120 nm thick) patterned by reactive microcontact printing using a PDMS stamp and tetramethylrhodamine cadaverine.

Subsequent experiments were performed to determine the extent to which the azlactone functionality in polymer 1/PEI films was accessible for reaction with larger amine-functionalized molecules. FIGS. 6a and 6b show an image of a film ~320 nm thick that was treated with a drop (~1.8 mm in diameter) of a solution of an amine-functionalized fluorophore (tetramethylrhodamine cadaverine) in DMSO, and then rinsed in fresh DMSO for one hour (FIG. 6a) or six hours (FIG. 6b). These images show clearly the presence of a circular area of red fluorescence on the film, scale bars correspond to 500 µm. The images in FIGS. 6c and 6d correspond to an identical experiment conducted using a polymer 1/PEI film that was first pre-treated, or 'blocked', by reacting residual azlactone functionality with propylamine (as described above), scale bars correspond to 500 µm. These images, when combined, suggest that the fluorescence observed in FIGS. 6a and 6b arises from the presence of fluorophore that has reacted with azlactone and is bound covalently to the film. FIG. 6e shows a representative image of a film ~120 nm thick with micrometer-scale patterns of red fluorescence transferred to the surface of the film by reactive microcontact printing using a polydimethylsiloxane (PDMS) stamp, scale bar correspond to 300 µm. This result demonstrates that these reactive polymer 1/PEI films are compatible with conventional soft lithography techniques used to pattern and transfer reactive chemical functionality to the surfaces of planar or complex objects.

Further characterization of fluorophore-treated films by PMIRRAS demonstrated a decrease in azlactone functionality upon treatment with fluorophore, but that not all azlactone functionality reacted (e.g., contrary to results observed upon treatment with propylamine; see FIG. 5b). It is not possible to determine the distribution of fluorophore throughout the depth of these ultrathin films on the basis of these IR experiments. However, these results do suggest that this large fluorophore may not be able to penetrate completely into these covalently crosslinked films, and that, in addition to patterning the functionality of these films in the x-y direction (as demonstrated in FIG. 6e), it may also be possible to functionalize or pattern differentially either the surfaces or the interiors of these films (or both) based on differences in the sizes of nucleophiles used to functionalize these materials.

Figure 6F:
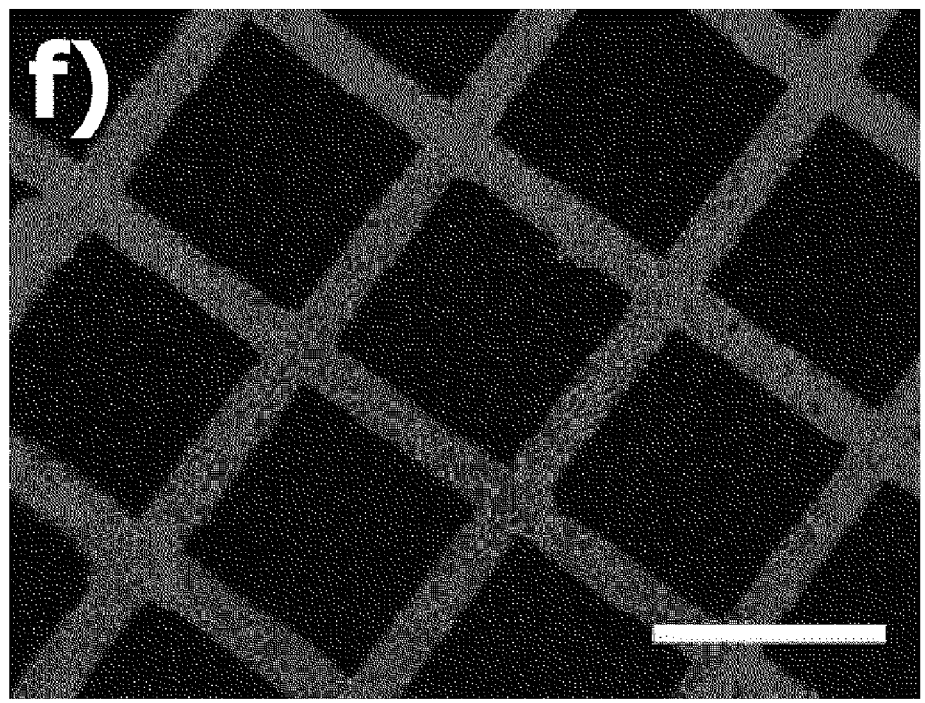
FIG. 6f shows an image of a transmission electron microscopy grid coated with an azlactone functionalized polymer/poly(ethylene imine) film and then functionalized using a hydrazide functionalized coumarin derivative.

Finally, two important practical advantages of conventional aqueous methods for the layer-by-layer assembly of polyelectrolyte-based assemblies on surfaces are i) the ability to deposit ultrathin films on surfaces constructed from a wide range of different materials and ii) the ability to fabricate continuous and conformal films on objects with topologically complex surfaces and micrometer- or nanometer-scale features. Additional experiments were conducted to determine whether the methods used for the deposition of polymer 1/PEI films could be used to deposit reactive conformal films on the metal surfaces of gold-coated transmission electron microscopy grids with dimensions and pores on scales of tens to hundreds of micrometers. FIG. 6f shows a fluorescence micrograph of a grid that was coated with a polymer 1/PEI film and then subsequently functionalized by reaction with a hydrazide-functionalized fluorophore (7-diethylaminocoumarin-3-carboxylic acid hydrazide) prior to imaging (in analogy to methods described above), scale bar correspond to 300 µm. Inspection of this image reveals bright blue fluorescence distributed evenly and uniformly over the surface of the grid, and the absence of blue fluorescence within the pores of the grid. These images are consistent with the presence of an ultrathin, reactive polymer film on the surface of the grid that conforms faithfully to the contours of the surface and the struts of the grid. The use of a hydrazide-functionalized fluorophore in these experiments demonstrates further the broader reactivity of the residual azlactones in these films with a range of functional nucleophiles.

Described herein is an approach to the layer-by-layer assembly of ultrathin, reactive polymer films that makes use of covalent bonds formed between alternating layers of a polyamine and the 'spring-loaded' functionality of poly(2-alkenyl azlactone)s. This approach is conceptually similar to conventional methods for the layer-by-layer assembly of multilayered polyelectrolyte films and permits precise, nanometer-scale control over the film thickness and composition. In contrast to conventional aqueous methods of assembly, however, fabrication of these materials is driven by the rapid, 'click'-type formation of covalent bonds and takes place entirely in organic solvents. It is possible to exploit the accessibility and reactivity of residual azlactone functionality in these thin films to further functionalize or tailor the properties of these covalently-crosslinked materials post-fabrication. The results described in this example suggest the basis of methods that could be used to modify, passivate, or pattern curved or topologically complex surfaces with chemical or biological functionality (e.g., proteins, peptides, or small molecule drugs or ligands) or to design stable, crosslinked thin films and coatings of interest in the contexts of catalysis, medicine, or other broad areas of biotechnology.

Experimental. Materials. All materials were used without further purification unless noted otherwise. Reagents, polymers, solvents and synthetic materials are purchasable or otherwise synthesizable using art known methods. Compressed air used to dry films and coated substrates was filtered through a 0.4 µm membrane syringe filter.

General Considerations. Silicon substrates (10 mm×50 mm) were cleaned with acetone, ethanol, methanol, and deionized water and dried under a stream of filtered, compressed air prior to the fabrication of multilayered films. Silicon substrates used for reflective infrared spectroscopy experiments were prepared by depositing thin layers of titanium (10 nm) and gold (200 nm) sequentially onto clean silicon wafers using an electron-beam evaporator (Tek-Vac Industries, Brentwood, N.Y.). The optical thicknesses of films were determined using a Gaertner LSE ellipsometer (632.8 nm, incident angle=70°). Data were processed using the Gaertner Ellipsometer Measurement Program. Relative thicknesses were calculated assuming an average refractive index of 1.58 for the multilayered films. Thicknesses were determined in at least five different standardized locations on each substrate and are presented as an average (with standard deviation) for each film. Static contact angle measurements were obtained on a Dataphysics OCA 15 Plus instrument. AFM images were acquired in tapping mode on a Nanoscope Multimode atomic force microscope (Digital Instruments, Santa Barbara, Calif.), using scan rates of 10-20 μm/s to obtain 256×256 pixel images. Silicon cantilevers with a spring constant of 40 N/m and a radius of curvature of less than 10 nm were used (model NSC15/NoAl, MikroMasch USA, Inc., Portland, Oreg.). Height data were flattened using a 2nd-order fit. Particle sizes and areal densities were calculated over the scan area using the Nanoscope® IIIa software package (Digital Instruments, Santa Barbara, Calif.).

Fabrication of Multilayered Films. Solutions of branched poly(ethyleine imine) (PEI) or poly(2-vinyl-4,4'-dimethylazlactone (polymer 1, PVDMA) were prepared in acetone solution (20 mM with respect to the molecular weight of the polymer repeat unit). Multilayered films were deposited on silicon substrates manually according to the following general protocol: 1) Substrates were submerged in a solution of PEI for 1 minute, 2) substrates were removed and immersed in an initial acetone bath for 1 minute followed by a second acetone bath for 1 minute, 3) substrates were submerged in a solution of polymer 1 for 1 minute, and 4) substrates were rinsed in the manner described above. This cycle was repeated until the desired number of PEI/polymer 1 layers (typically 10) was reached. Films were either characterized or used in subsequent experiments immediately or were dried under a stream of filtered, compressed air and stored in a vacuum desiccator. All films were fabricated at ambient room temperature.

Post-Fabrication Functionalization of Multilayered Thin Films. Experiments designed to investigate the reactivity of residual azlactone groups in PEI/polymer 1 films with small, hydrophobic amines (e.g., propylamine) were conducted by incubating films deposited on goldcoated silicon substrates into solutions of amine (50 mM, in DMSO) at 37° C. for predetermined lengths of time. The films were then rinsed generously, dried under air, and characterized by PM-IRRAS. Polarization-modulation infrared reflectance-absorbance spectroscopy (PM-IRRAS) was conducted in analogy to previously reported methods. Briefly, gold-coated silicon substrates coated with multilayered films were placed at an incident angle of 830 in a Nicolet Magna-IR 860 Fourier transform infrared spectrophotometer equipped with a photoelastic modulator (PEM-90, Hinds Instruments, Hillsboro, Oreg.), a synchronous sampling demodulator (SSD-100, GWC Technologies, Madison, Wis.), and a liquid-nitrogen-cooled mercury-cadmium-telluride detector. The modulation was set at 1500 $cm^{-1}$, and 500 scans were obtained for each sample at a resolution of 4 $cm^{-1}$. The differential reflectance infrared spectra were then normalized and converted to absorbance spectra using a previously reported procedure.

Example 2

Modification of Protein/Cell Adhesion on Surfaces: Materials and Methods

Materials. Reagents, polymers, solvents and synthetic materials are purchasable or otherwise synthesizable using art known methods. All materials were used as received without further purification unless noted otherwise. Compressed air used to dry films and coated substrates was filtered through a 0.4 μm membrane syringe filter.

General Considerations. Silicon (10 mm×50 mm) and glass (10 mm×30 mm) substrates were cleaned with acetone, ethanol, methanol, and deionized water and dried under a stream of filtered, compressed air prior to the fabrication of multilayered films. Optical and fluorescence microscopy images were taken using an Olympus IX70 microscope and analyzed using the Metavue version 4.6 software package (Universal Imaging Corporation).

Fabrication of Multilayered Films. Solutions of PEI or PVDMA were prepared in acetone solution (20 mM with respect to the molecular weight of the polymer repeat unit). Multilayered films were deposited on silicon or glass substrates manually according to the following general protocol: 1) Substrates were submerged in a solution of PEI for 30 seconds, 2) substrates were removed and immersed in an initial acetone bath for 30 seconds followed by a second acetone bath for 30 seconds, 3) substrates were submerged in a solution of PVDMA for 30 seconds, and 4) substrates were rinsed in the manner described above. This cycle was repeated until the desired number of PEI/PVDMA layers was reached. Films were either characterized or used in subsequent experiments immediately or were dried under a stream of filtered, compressed air and stored in a vacuum desiccator. All films were fabricated at ambient room temperature.

Post-Fabrication Functionalization of Multilayered Thin Films. Substrates coated with PEI/PVDMA films were functionalized post-fabrication by immersion of the substrate in solutions of the designated amine-functionalized nucleophile (decylamine or glucamine, 50 mM in DMSO) at room temperature for at least 24 hours. Films were rinsed in DMSO for ~1 hour; the DMSO was exchanged at least once during the rinse. Films were stored in a vacuum desiccator after fabrication and functionalization until further use. PEI/PVDMA films that were patterned with small, circular spots of glucamine were treated with a 1-μL drop of a glucamine solution (20 mg/mL in DMSO) for 2 hours. Films were rinsed with DMSO for 1 hour and finally with liberal amounts of ethanol and dried. Spotted films were either placed in the desiccator or immersed in a 50 mM solution of decylamine in DMSO to functionalize the azlactone groups surrounding the glucamine-treated areas. All modified films were rinsed liberally with ethanol following the surface reaction and dried with filtered air.

Cell-Culture on PEI/PVDMA Films. Experiments designed to investigate the attachment and proliferation of mammalian cells on unmodified and modified PEI/PVDMA films were carried out by fabricating films on glass substrates using the alternate dipping procedure described above. Unmodified films containing reactive azlactone functionality as well as films modified with either decylamine or glucamine as described above were stored in a vacuum desiccator until cells were ready to be cultured.

Treated and untreated PEI/PVDMA films were placed individually into wells of tissue culture treated, polystyrene plates. For experiments using COS-7 cells, cells were seeded on top of the films at an initial density of 50,000 or 75,000 cells/mL in Dulbecco's modified Eagle medium (DMEM) supplemented with 10% (v/v) fetal bovine serum, 100 units/mL penicillin, and 100 μg/mL streptomycin. For experiments using 3T3 fibroblasts, cells were seeded on top of films at an initial density of 110,000 cells/mL in Dulbecco's modified Eagle medium (DMEM) containing 10% (v/v) calf bovine serum, 100 units/mL penicillin, and 100 μg/mL streptomycin. For both cell types, cells were seeded directly on top of substrates in ~0.2 mL of DMEM, allowed to adsorb to the surface for 20 minutes at room temperature, and finally diluted with 2-3 mL of the appropriate medium. Cells were incubated with substrates for at least 24 hours at 37° C. to allow attachment and growth. After 24-48 hours, cells were stained with 2 mL of a Calcein AM staining solution (1 µg/mL in PBS) for 30 minutes at 37° C. Following incubation, the staining solution was aspirated and replaced with 2 mL of DMEM. Cells were imaged by optical light microscopy and fluorescence microscopy without removal of glass substrates.

For long-term cell experiments, PEI/PVDMA films treated with a 1-µL drop of glucamine were placed in cell culture wells and seeded with COS-7 cells at 50,000 cells/mL using the procedures discussed above. Cells were imaged using optical microscopy every 48-72 hours. Cells were stained with Calcein AM every 3 or 4 days according to the procedure outlined in the previous paragraph and imaged using fluorescence microscopy. Cell culture media was changed every 48 hours for the first 3 weeks and every 12-24 hours thereafter.

Investigation of Protein Adhesion. PEI/PVDMA thin films composed of 10 bilayers were fabricated on silicon substrates and modified with either decylamine or glucamine as discussed above. Unmodified films were stored in a vacuum desiccator until further use. For protein adhesion experiments, a 1 µL drop of an aqueous solution of FITC-labelled bovine serum albumin (10 µM, PBS buffer, pH 7.4) was spotted on modified and unmodified films and allowed to absorb, or react, with the surface for 1.75 hours. Films were placed in a humidified environment during the adsorption process to minimize evaporation. Films were rinsed by flowing a stream of water over the surface followed by shaking in a 1% (v/v) Tween 20 solution three times for 15, 5, and 5 minutes each. Films were rinsed a final time with distilled water, dried with filtered air, and characterized by fluorescence microscopy.

Figure 7A:
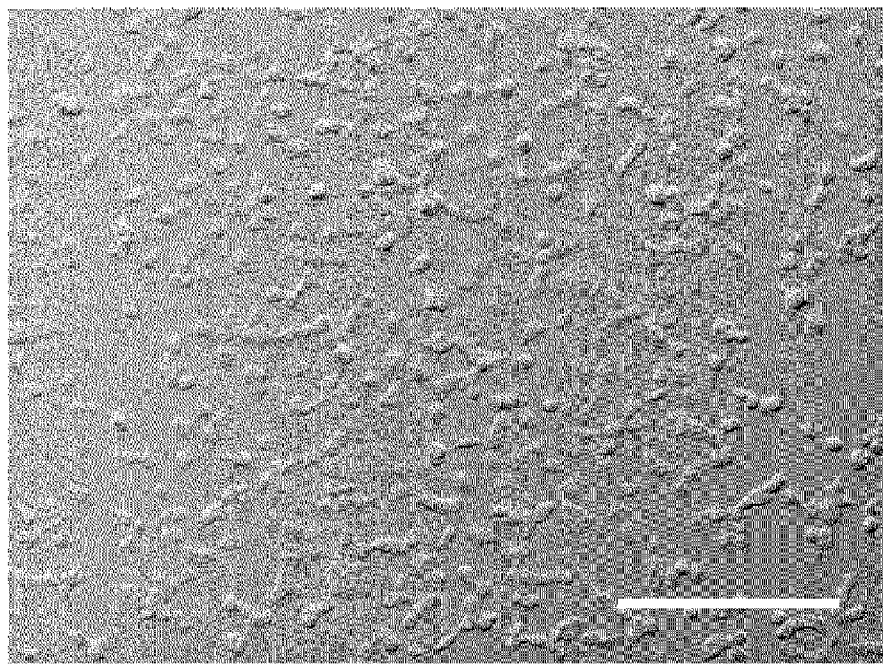
FIGS. 7a and 7b respectively show optical and fluorescence images of COS-7 cells seeded on an unmodified azlactone functionalized/poly(ethylene imine) ultrathin film.
Figure 7B:
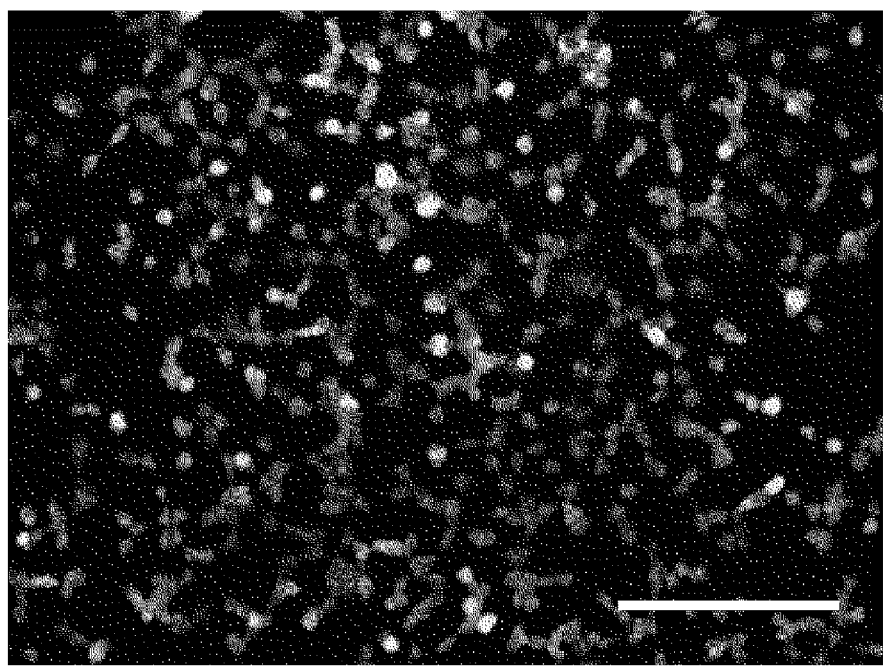
Figure 7C:
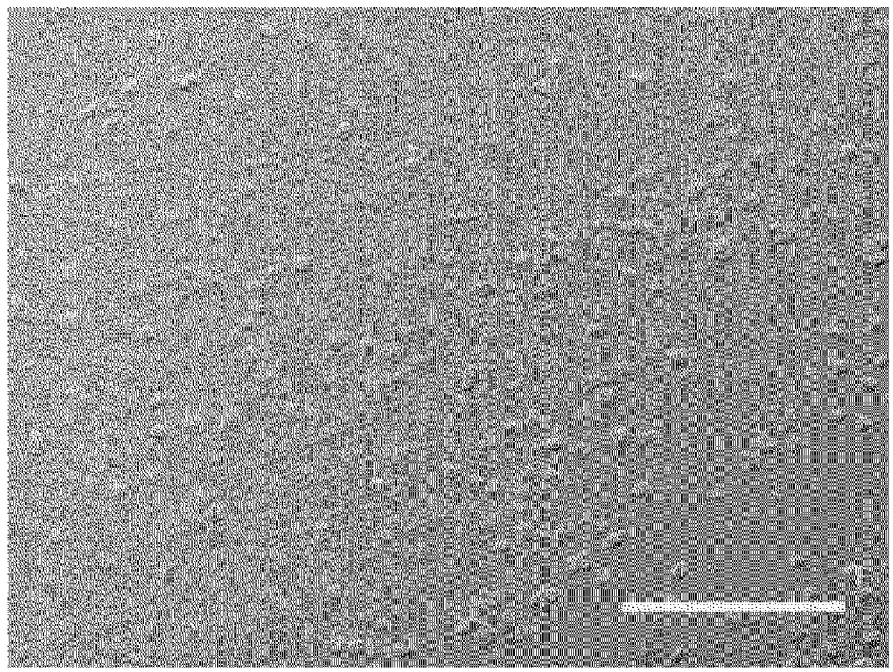
FIGS. 7c and 7d respectively show optical and fluorescence images of COS-7 cells seeded on an azlactone functionalized/poly(ethylene imine) ultrathin film modified by exposure to decylamine before seeding the film with cells.
Figure 7D:
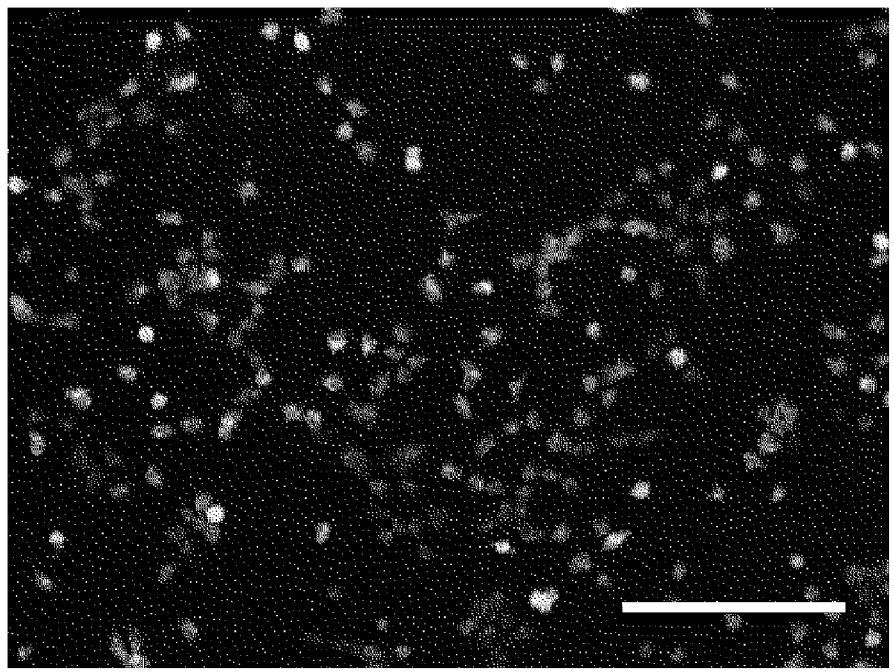
Figure 7E:
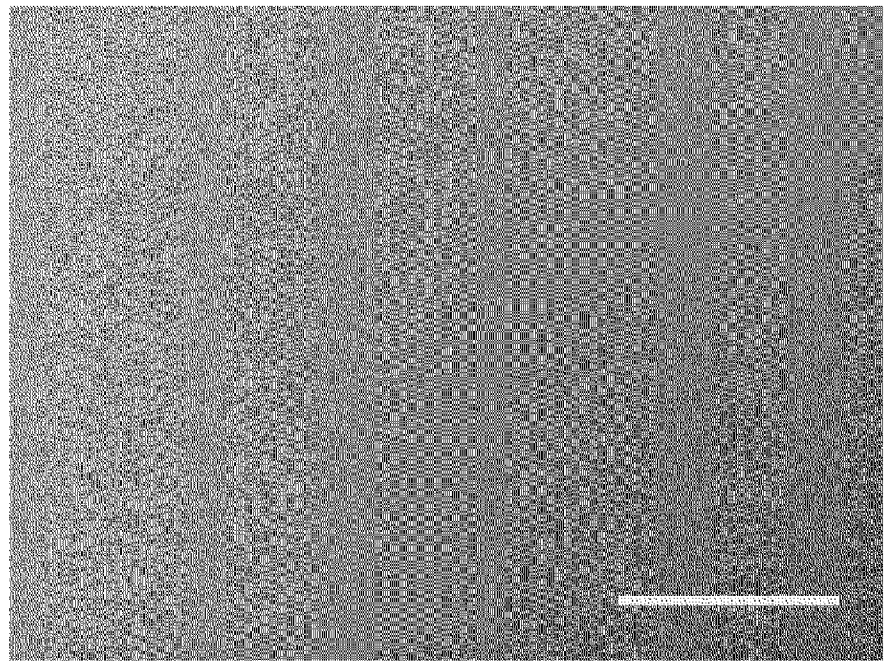
FIGS. 7e and 7f respectively show optical and fluorescence images of COS-7 cells seeded on an azlactone functionalized/poly(ethylene imine) ultrathin film modified by exposure to glucamine before seeding the film with cells FIGS. 8a, 8b, and 8c respectively show fluorescence micrographs of a 1 µL drop of FITC-labeled bovine serum albumin (BSA) adsorbed onto and/or reacted with an unmodified azlactone functionalized/poly(ethylene imine) film, a decylamine-treated azlactone functionalized/poly(ethylene imine) film, and a glucamine-treated azlactone functionalized/poly(ethylene imine) film.
Figure 7F:
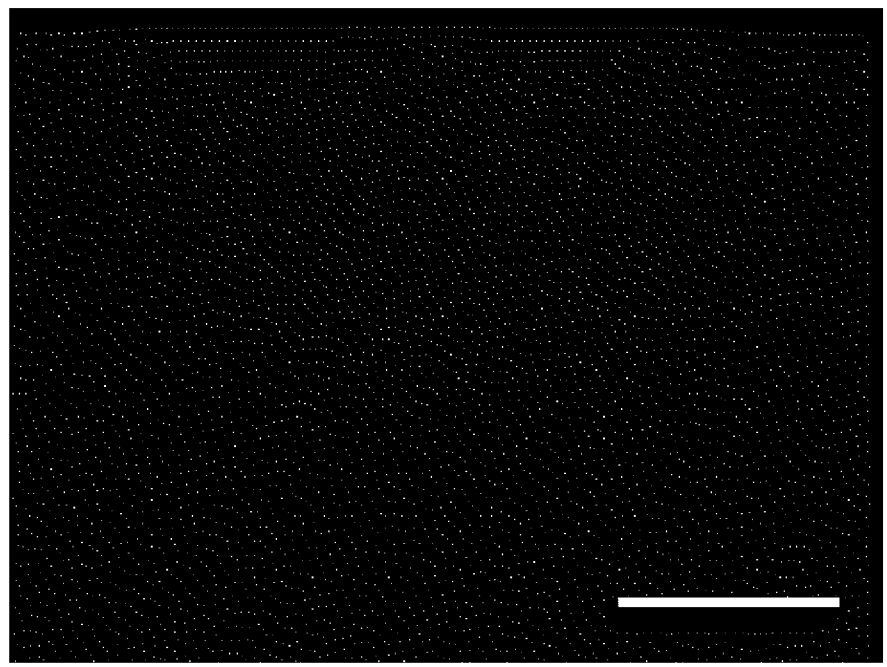

Results. Shown in FIGS. 7a, 7c and 7e are optical images of COS-7 cells seeded on ultrathin films; FIGS. 7b, 7d and 7f respectively show fluorescence images of the same ultrathin films. The images in FIGS. 7a and 7b show unmodified polymer 1/PEI film. The images in FIGS. 7c and 7d show a polymer 1/PEI film modified by exposure to decylamine before seeding the film with cells and show a reduced cell population in the images. The images in FIGS. 7e and 7f show a polymer 1/PEI film modified by exposure to glucamine before seeding the film with cells and show a further reduction of cell population in the image. Cells were stained with a live stain (Calcein AM), and the scale bars are 300 µm.

Figure 8:
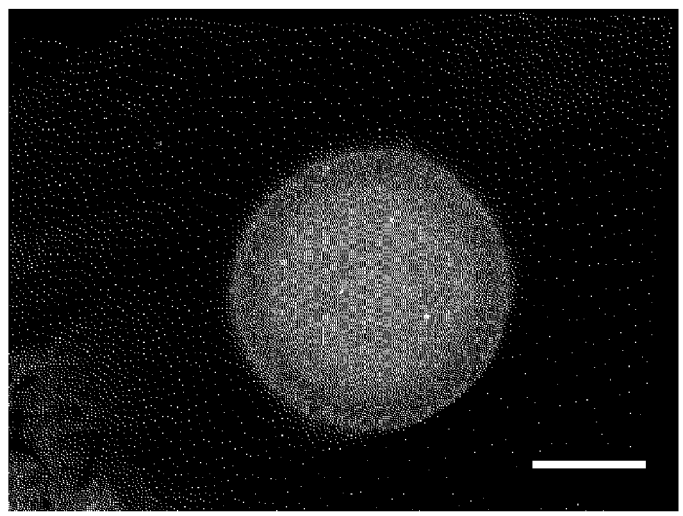
Figure 8:
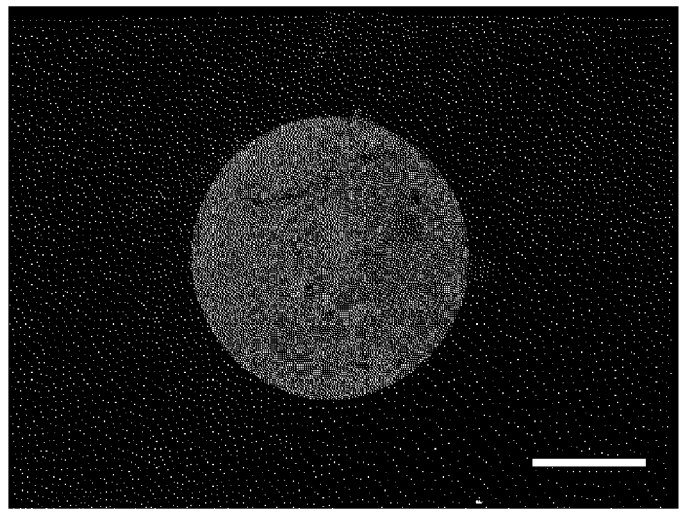
Figure 8:
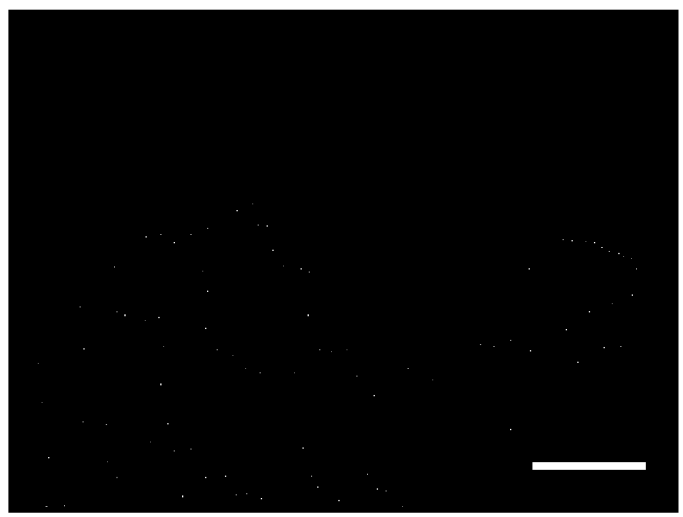

FIGS. 8a, 8b and 8c show fluorescence micrographs of a 1 µL drop of FITC-labeled bovine serum albumin (BSA) adsorbed onto and/or reacted with an unmodified polymer 1/PEI film (FIG. 8a), a decylamine-treated polymer 1/PEI film (FIG. 8b), and a glucamine-treated polymer 1/PEI film (FIG. 8c). The population of BSA retained on the surface of a film is reduced upon treatment with decylamine; upon treatment of a film with glucamine, the retention is near zero. Scale bars in these images are 500 µm.

Figure 9A:
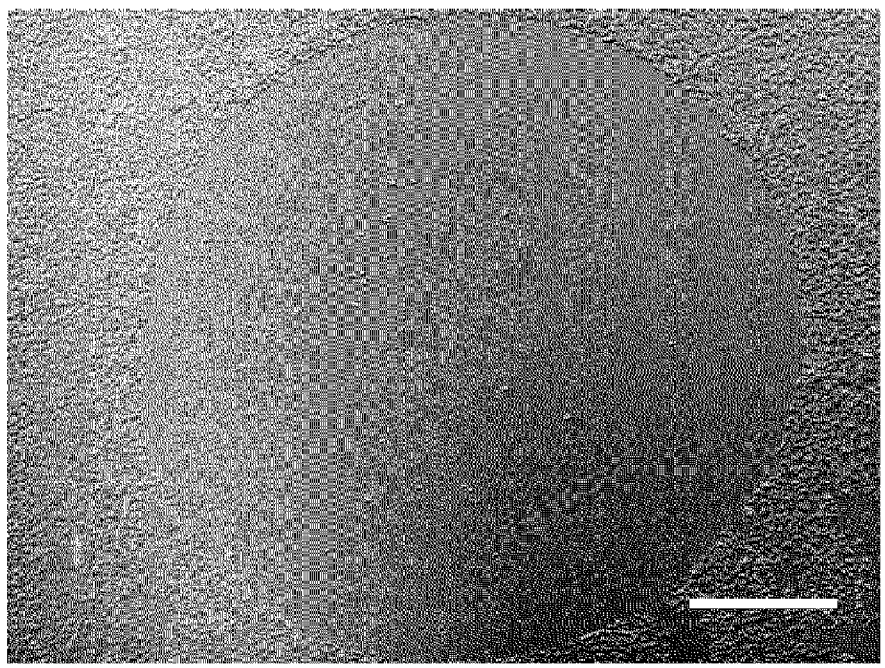
FIGS. 9a and 9b respectively show optical and fluorescence micrographs of an azlactone functionalized/poly(ethylene imine) film reacted with a 1 µL drop of a glucamine solution (20 mg/mL in DMSO) and seeded with COS-7 cells.
Figure 9B:
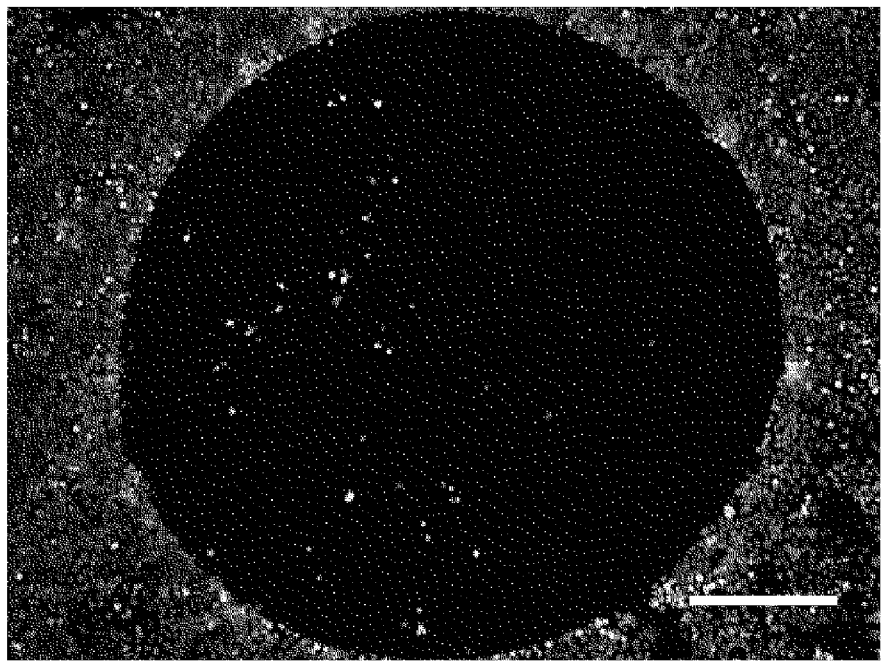
Figure 9C:
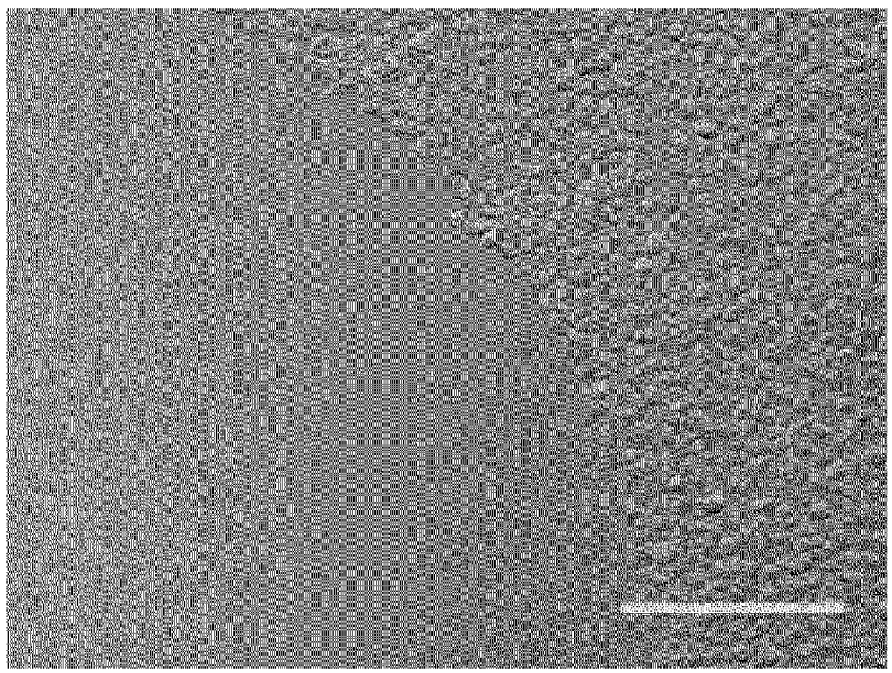
FIGS. 9c and 9d show higher magnification images of those shown in FIGS. 9a and 9b.
Figure 9D:
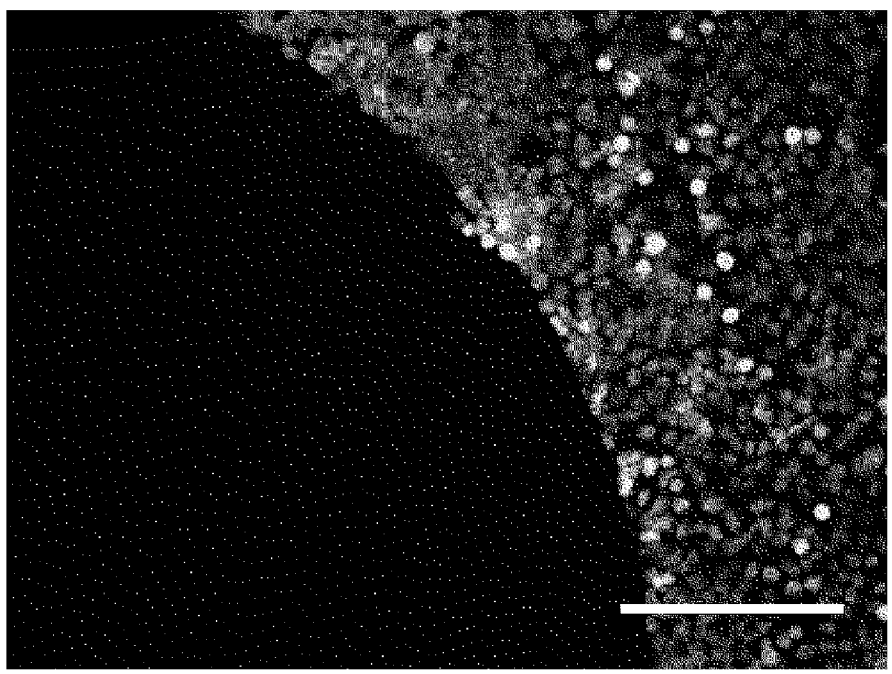
Figure 9E:
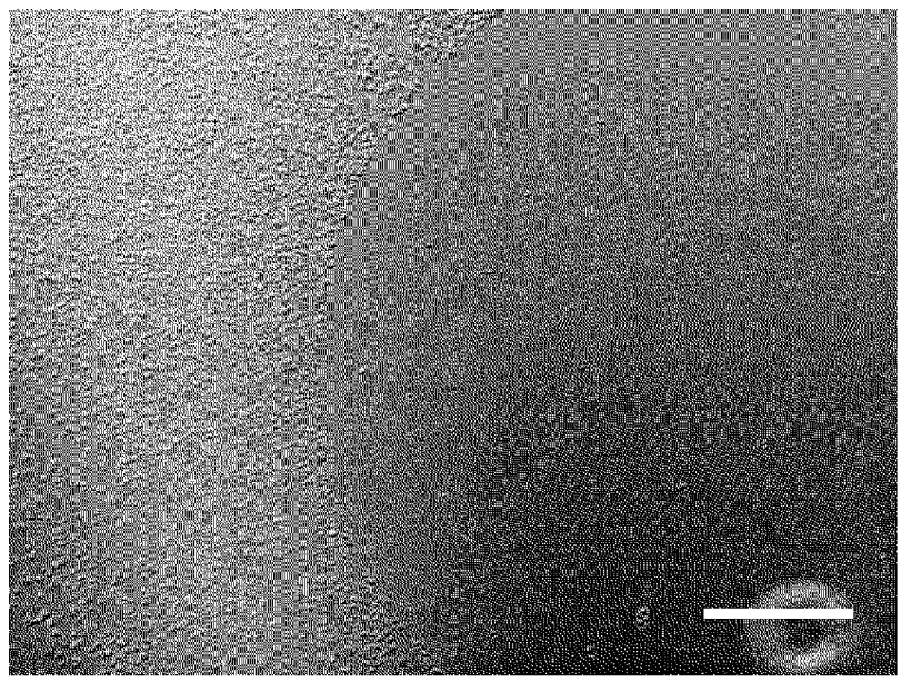
FIGS. 9e and 9f respectively show phase contrast and fluorescence images of an azlactone functionalized/poly(ethylene imine) film reacted with a drop of glucamine followed by reaction of the entire film with decylamine prior to seeding with COS-7 cells
Figure 9F:
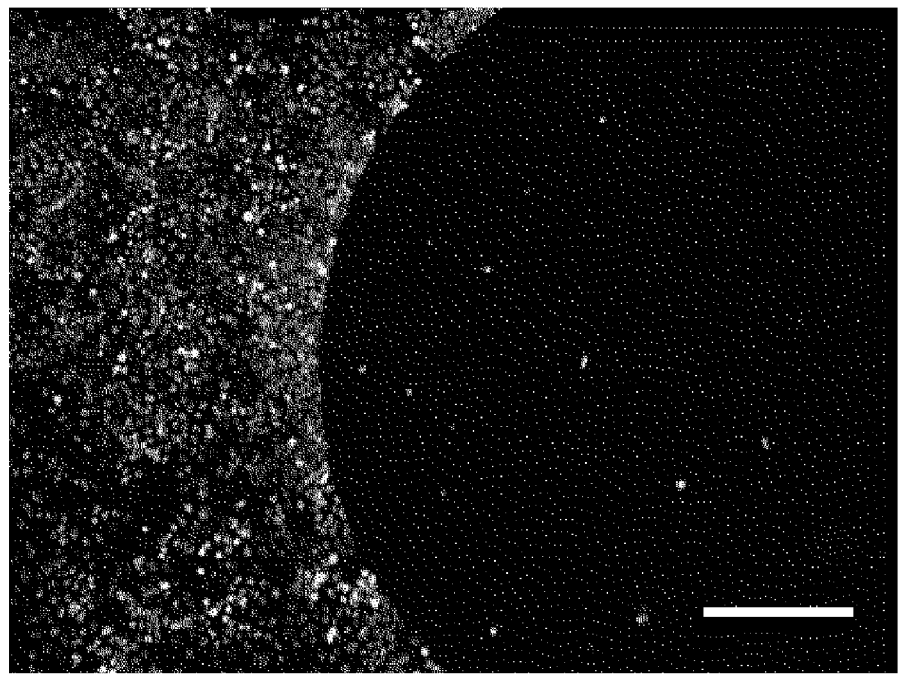
Figure 10A:
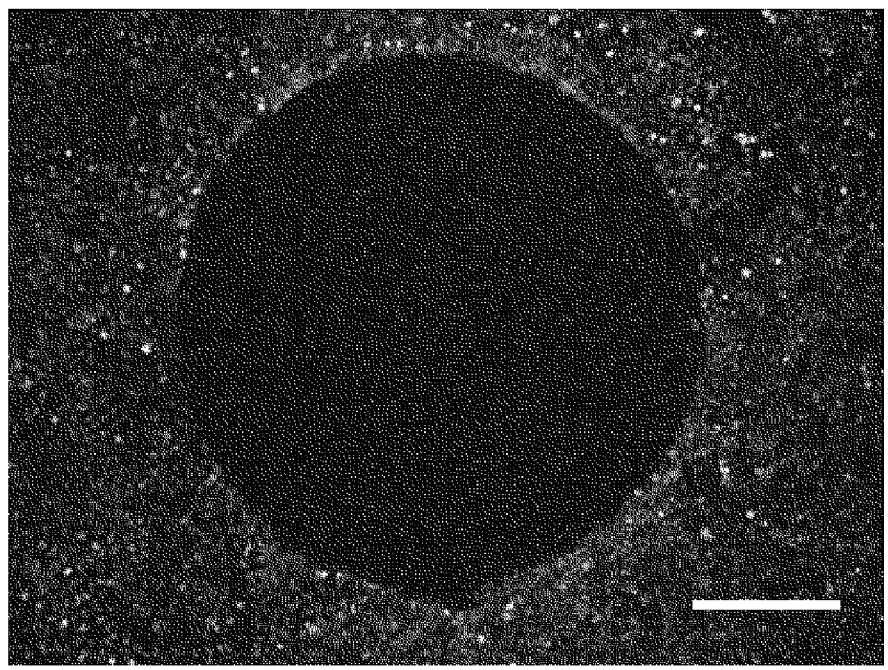
FIGS. 10a 10b 10c 10d 10e and 10f show fluorescence micrographs of COS-7 cells seeded on an azlactone functionalized/poly(ethylene imine) film that was treated with a 1 µL drop of glucamine. The cells were stained with Calcein AM and images after 4 days (FIG. 10a), 13 days (FIG. 10b), 22 days (FIG. 10c), 32 days (FIG. 10d), 43 days (FIG. 10e) and 56 days (FIG. 10f) of incubation.
Figure 10B:
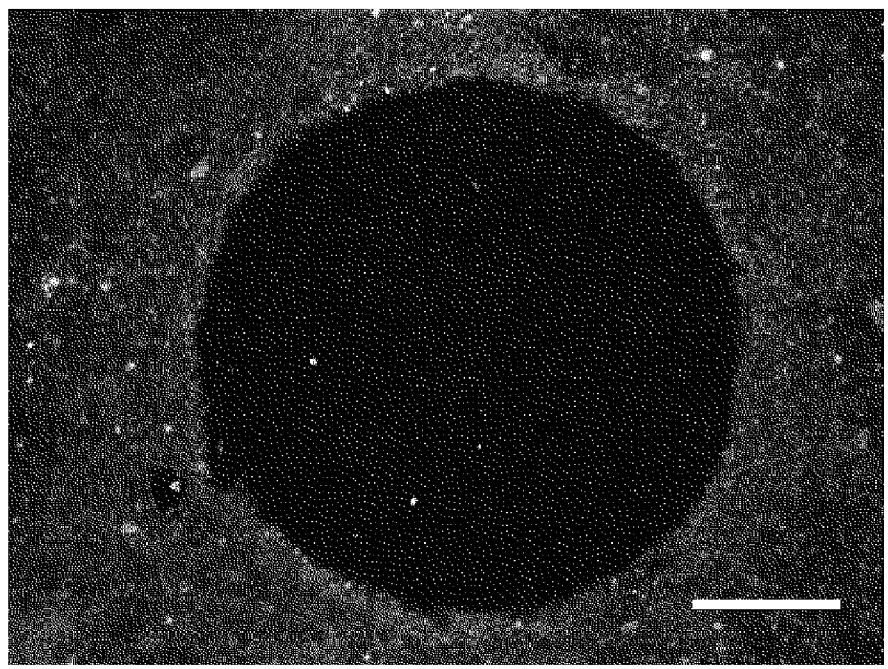
Figure 10C:
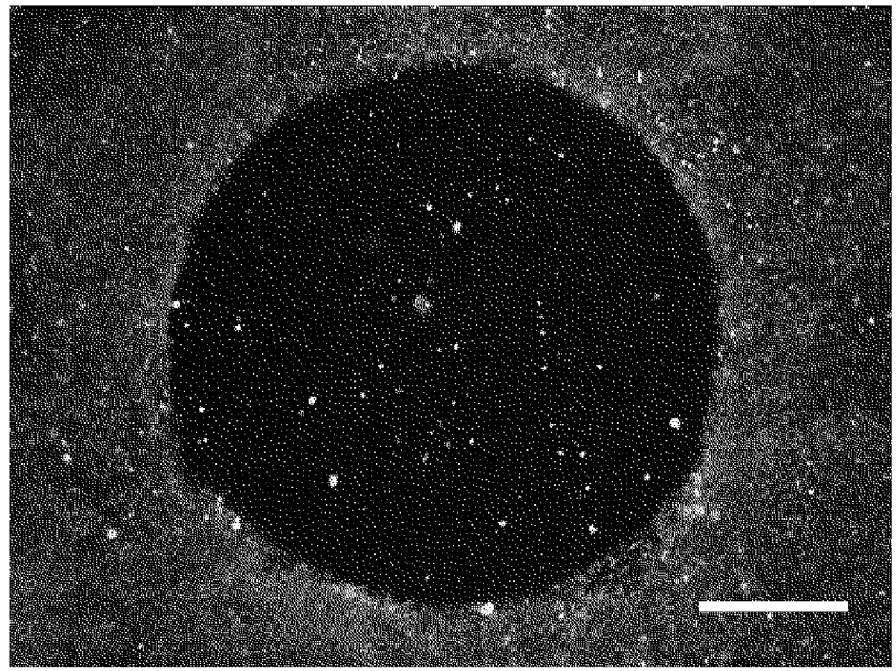
Figure 10D:
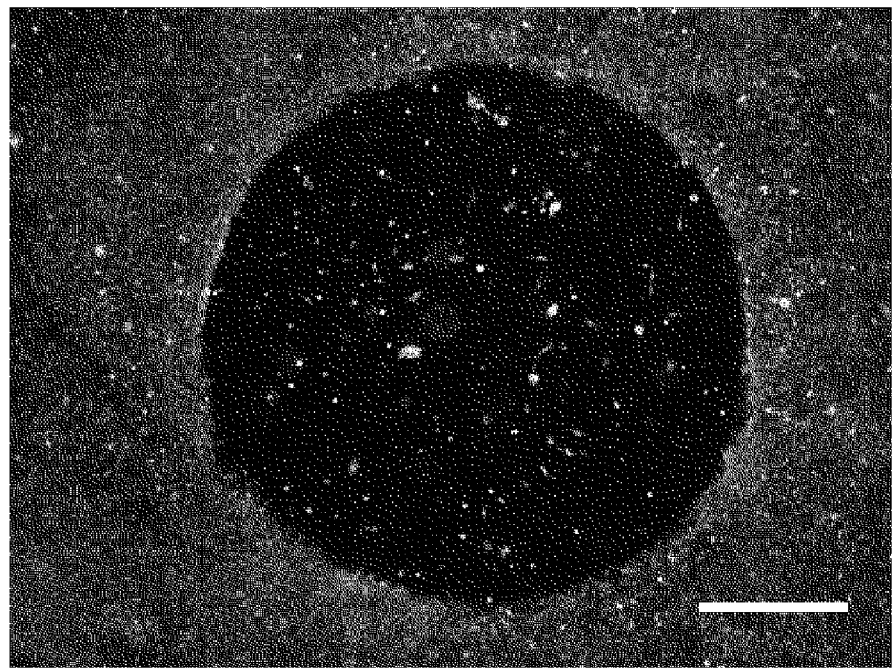
Figure 10E:
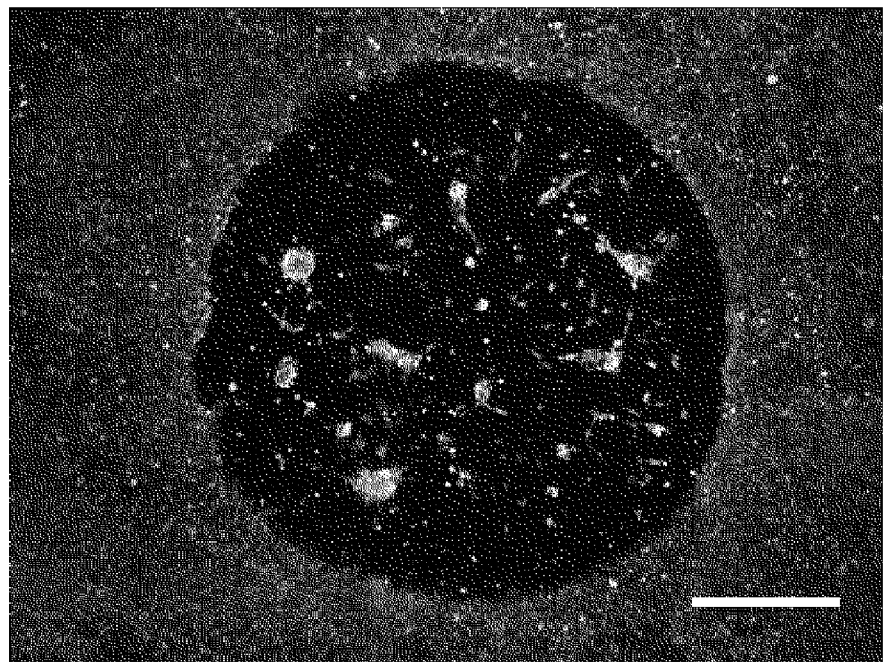
Figure 10F:
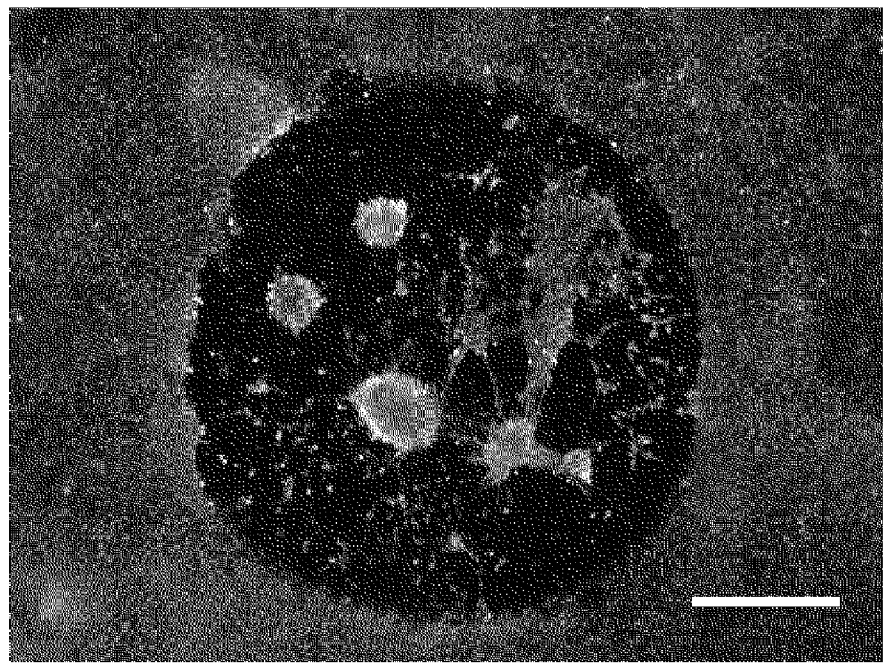

Shown in FIGS. 9a, and 9b respectively show optical and fluorescence micrographs of a polymer 1/PEI film reacted with a 1 µL drop of a glucamine solution (20 mg/mL in DMSO) and seeded with COS-7 cells. Cells were stained with Calcein AM. Images 9c and 9d correspond to higher magnification images of those shown in FIGS. 9a and 9b. Images shown in FIGS. 9e and 9f correspond to phase contrast and fluorescence images of a polymer 1/PEI film reacted with a drop of glucamine followed by reaction of the entire film with decylamine prior to seeding cells. Scale bars for images in FIGS. 9a, 9b, 9e and 9f are 500 µm. Scale bars in FIGS. 9c and 9d are 300 µm.

Figure 11:
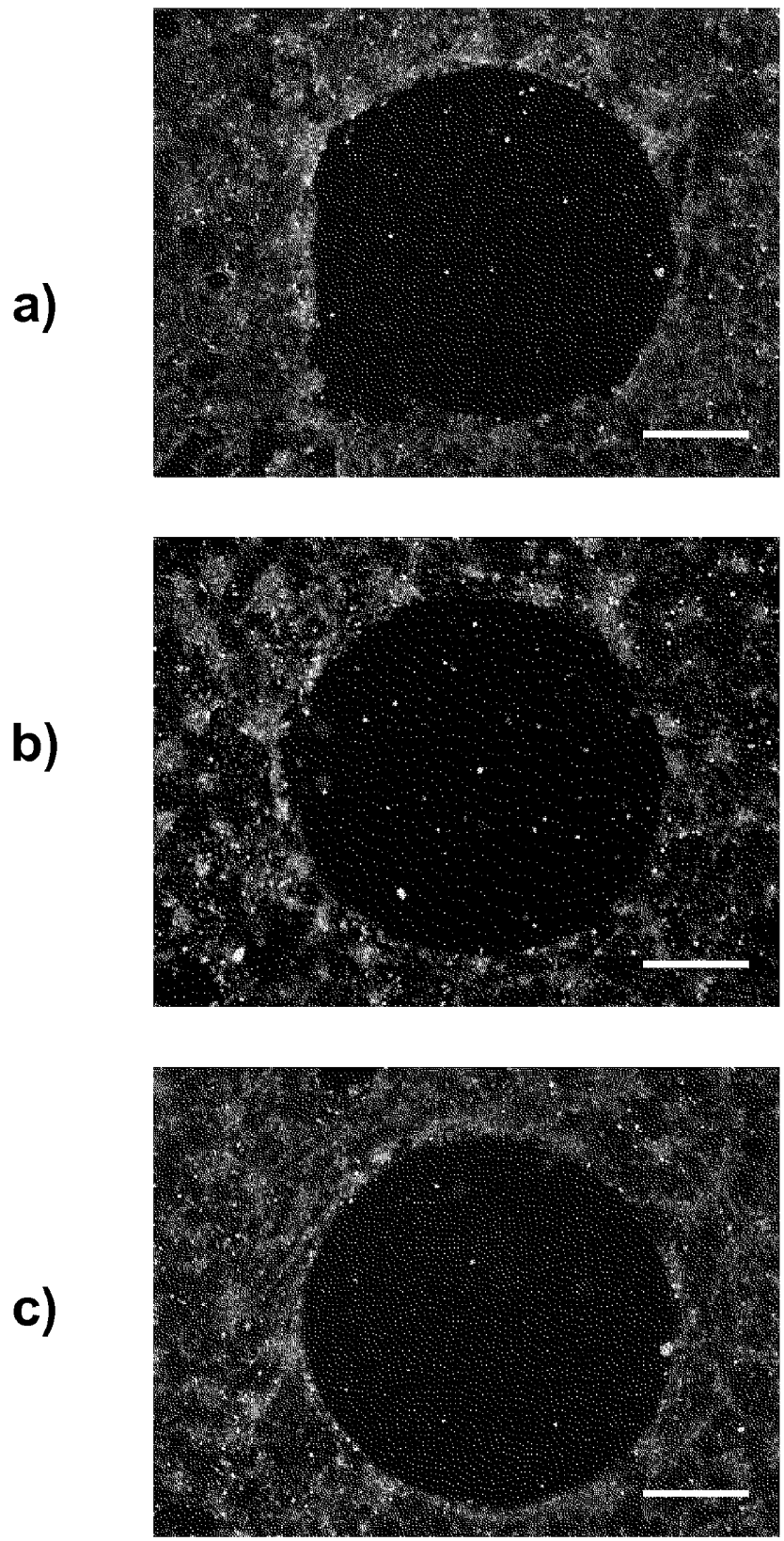
FIGS. 11a, 11b and 11c respectively show fluorescence micrographs of COS-7 cells stained with Calcein AM after the substrates were treated with trypsin and reseeded with new cells 1 time, 2 times and 3 times.

FIGS. 10a, 10b, 10c, 10d, 10e and 10f show fluorescence micrographs of COS-7 cells seeded on a polymer 1/PEI film that was treated similarly with a 1 µL drop of glucamine. The cells were allowed to grow continuously on the substrates for almost 2 months. The cells were stained with Calcein AM and images after 4 days (FIG. 10a), 13 days (FIG. 10b), 22 days (FIG. 10c), 32 days (FIG. 10d), 43 days (FIG. 10e) and 56 days (FIG. 10f) of incubation. FIGS. 11a, 11b and 11c show fluorescence micrographs of COS-7 cells stained with Calcein AM after the substrates were treated with trypsin and reseeded with new cells 1 time (FIG. 11a), 2 times (FIG. 11b) and 3 times (FIG. 11c). The scale bars for FIGS. 10a-f and 11a-c are 500 µm.

Example 3

Free-Standing Films: Materials and Methods

Materials. Reagents, polymers, solvents and synthetic materials are purchasable or otherwise synthesizable using art known methods. All materials were used as received without further purification unless noted otherwise.

General Considerations. Silicon (35 mm×30 mm) substrates were cleaned with acetone, ethanol, methanol, and deionized water and dried under a stream of filtered, compressed air prior to the fabrication of multilayered films. Fluorescence microscopy images were obtained using an Olympus IX70 microscope and analyzed using the Metavue version 4.6 software package (Universal Imaging Corporation). Digital images were acquired using a Nikon Coolpix 4300 digital camera.

Fabrication of Multilayered Films. Solutions of PEI or PVDMA were prepared in acetone solution (20 mM with respect to the molecular weight of the polymer repeat unit). Multilayered films were deposited on silicon or glass substrates manually according to the following general protocol: 1) Substrates were submerged in a solution of PEI for 1 minute, 2) substrates were removed and immersed in an initial acetone bath for 1 minute followed by a second acetone bath for 1 minute, 3) substrates were submerged in a solution of PVDMA for 1 minute, and 4) substrates were rinsed in the manner described above. This cycle was repeated until the desired number (typically, 50 or 100) of PEI/PVDMA layers was reached. Films were either characterized or used in subsequent experiments immediately or were dried under a stream of filtered, compressed air and stored in a vacuum desiccator. All films were fabricated at ambient room temperature.

pH-induced Delamination of PEI/PVDMA Multilayered Films. PEI/PVDMA films fabricated on silicon were scored with a razor blade along the edges of the film in a square/rectangle pattern to aid in peeling the film from the silicon. The films were then immersed in an aqueous solution at pH 3.3 (adjusted with 1 M HCl). After approximately 38 minutes, the films were peeled from the silicon using tweezers. The films were then transferred to an acetone solution, laid flat on a square piece of Teflon, and pulled out of the acetone and allowed to dry. Dry, free-standing PEI/PVDMA films could then be obtained by peeling the film off of the Teflon. Free-standing films could also be transferred to other substrates simply by spreading a free floating film in the water or acetone bath across the substrate of choice and drawing the substrate out of the solution such that the film remains spread across the surface (similar to a Langmuir-Blodgett or Langmuir-Shaefer transfer).

Figure 12:
FIGS. 12a, 12b, 12c and 12d and show digital images of a 100-bilayer PEI/PVDMA film immersed in water at pH 3.3. The images were acquired after 10 minutes (FIG. 12a), 23 minutes (FIG. 12b) and 38 minutes (FIG. 12c) as the film is soaking in the water bath.
FIG. 12e shows the free-standing film being pulled from an acetone bath with tweezers.
FIG. 12f shows the dry film next to a scale in centimeters.
Figure 12:
Figure 12:
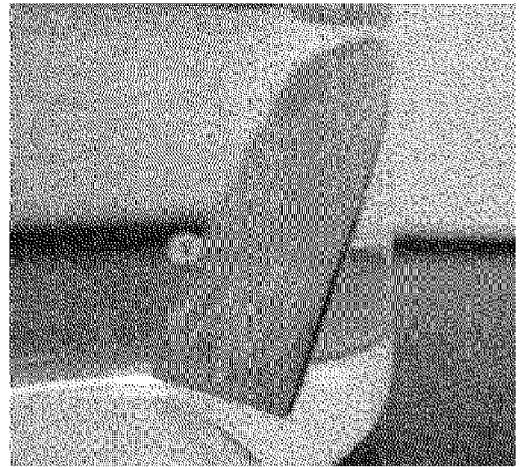
Figure 12:
Figure 12:
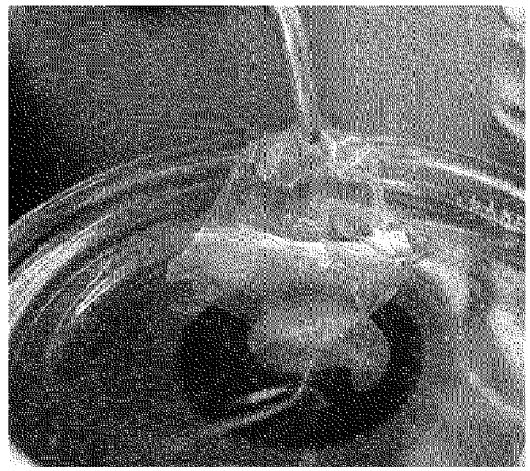
Figure 12:

Images. FIGS. 12a, 12b, 12c and 12d and show digital images of a 100-bilayer PEI/PVDMA film immersed in water at pH 3.3. The images were acquired after 10 minutes (FIG. 12a), 23 minutes (FIG. 12b) and 38 minutes (FIG. 12c) as the film is soaking in the water bath. FIG. 12d show an image of the film peeled from the silicon surface in water using tweezers. FIG. 12e shows the free-standing film being pulled from an acetone bath with tweezers. FIG. 12f shows the dry film next to a scale in centimeters.

Figure 13:
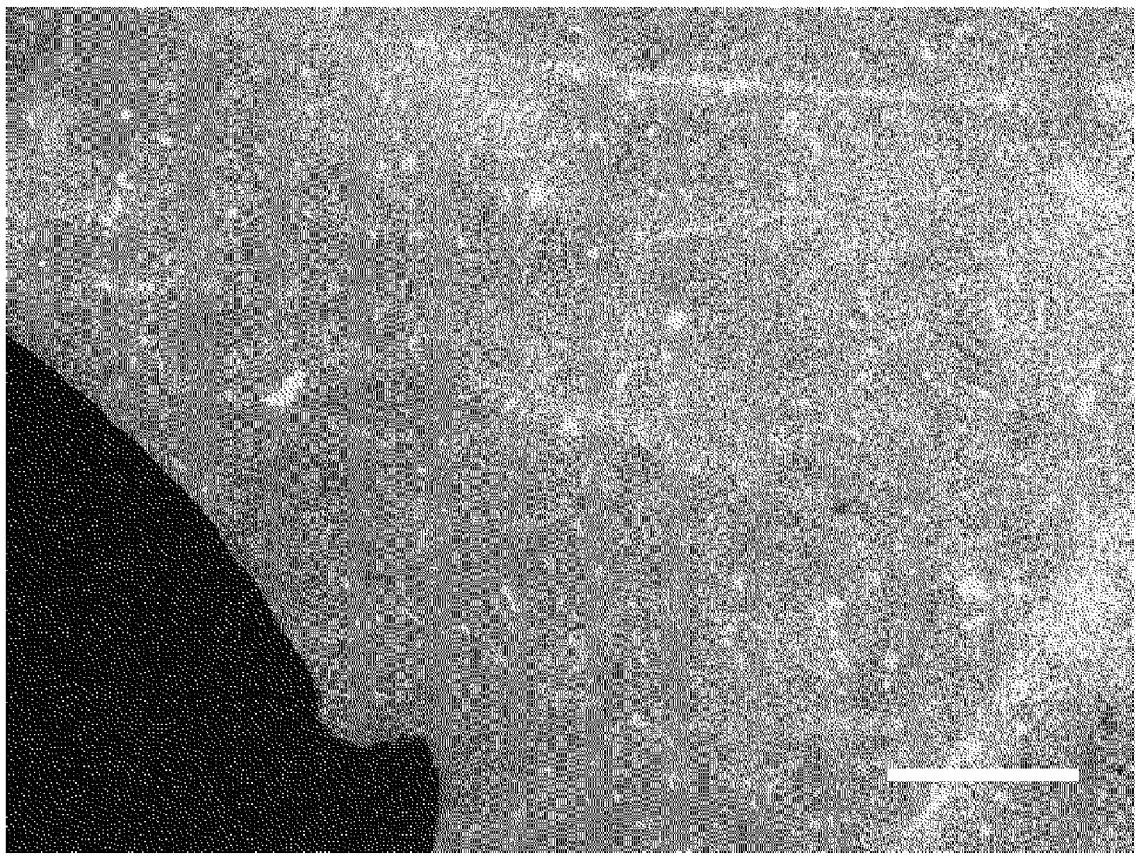
FIG. 13 shows a fluorescence micrograph of an isolated free-standing film reacted with coumarin hydrazide.

FIG. 13 shows a fluorescence micrograph of an isolated free-standing film reacted with coumarin hydrazide. The scale bar in FIG. 13 is 500 µm.

REFERENCES

J. Lahann, M. Balcells, T. Rodon, J. Lee, I. S. Choi, K. F. Jensen, R. Langer, Langmuir 2002, 18, 3632.
J. Lahann, M. Balcells, H. Lu, T. Rodon, K. F. Jensen, R. Langer, Anal. Chem. 2003, 75, 2117.
C. Jerome, S. Gabriel, S. Voccia, C. Detrembleur, M. Ignatova, R. Gouttebaron, R. Jerome, Chem. Commun. 2003, 2500.
C. L. Feng, Z. Z. Zhang, R. Forch, W. Knoll, G. J. Vancso, H. Schonherr, Biomacromolecules 2005, 6, 3243.
C. L. Feng, G. J. Vancso, H. Schonherr, Adv. Funct. Mater. 2006, 16, 1306.
G. Decher, Science 1997, 277, 1232.
P. Bertrand, A. Jonas, A. Laschewsky, R. Legras, Macromol. Rapid Commun. 2000, 21, 319.
C. S. Peyratout, L. Dahne, Angew. Chem. Int. Edit. 2004, 43, 3762.
P. T. Hammond, Adv. Mater. 2004, 16, 1271.
J. Q. Sun, T. Wu, F. Liu, Z. Q. Wang, X. Zhang, J. C. Shen, Langmuir 2000, 16, 4620.
S. Y. Yang, M. F. Rubner, J. Am. Chem. Soc. 2002, 124, 2100.
X. Zhang, T. Wu, J. Q. Sun, J. C. Shen, Colloid Surface A 2002, 198, 439.
B. Y. Li, D. T. Haynie, Biomacromolecules 2004, 5, 1667.
L. Richert, F. Boulmedais, P. Lavalle, J. Mutterer, E. Ferreux, G. Decher, P. Schaaf, J. C. Voegel, C. Picart, Biomacromolecules 2004, 5, 284.
A. Schneider, G. Francius, R. Obeid, P. Schwinte, J. Hemmerle, B. Frisch, P. Schaaf, J. C. Voegel, B. Senger, C. Picart, Langmuir 2006, 22, 1193.
K. F. Ren, J. Ji, J. C. Shen, Bioconjugate Chem. 2006, 17, 77.
A. N. Zelikin, J. F. Quinn, F. Caruso, Biomacromolecules 2006, 7, 27.
A. Schneider, C. Vodouhe, L. Richert, G. Francius, E. Le Guen, P. Schaaf, J. C. Voegel, B. Frisch, C. Picart, Biomacromolecules 2007, 8, 139.
J. Y. Chen, G. B. Luo, W. X. Cao, Macromol. Rapid Commun. 2001, 22, 311.
T. Serizawa, K. Nanameki, K. Yamamoto, M. Akashi, Macromolecules 2002, 35, 2184.
Y. J. Zhang, S. G. Yang, Y. Guan, W. X. Cao, J. Xu, Macromolecules 2003, 36, 4238.
Z. Q. Liang, Q. Wang, Langmuir 2004, 20, 9600.
Z. Q. Liang, K. L. Dzienis, J. Xu, Q. Wang, Adv. Funct. Mater. 2006, 16, 542.
G. K. Such, J. F. Quinn, A. Quinn, E. Tjipto, F. Caruso, J. Am. Chem. Soc. 2006, 128, 9318.
S. M. Heilmann, J. K. Rasmussen, L. R. Krepski, J. Polym. Sci. Pol. Chem. 2001, 39, 3655.
H. C. Kolb, M. G. Finn, K. B. Sharpless, Angew. Chem. Int. Edit. 2001, 40, 2004.
G. J. Drtina, S. M. Heilmann, D. M. Moren, J. K. Rasmussen, L. R. Krepski, H.
K. Smith, R. A. Pranis, T. C. Turek, Macromolecules 1996, 29, 4486.
B. Guichard, C. Noel, D. Reyx, M. Thomas, S. Chevalier, J. P. Senet, Macromol. Chem. Phys. 1998, 199, 1657.
S. F. Xie, F. Svec, J. M. J. Frechet, Biotechnol. Bioeng. 1999, 62, 30.
K. Yang, K. Cadwell, N. L. Abbott, J. Phys. Chem. B 2004, 108, 20180.
J. Zhang, N. J. Fredin, D. M. Lynn, J. Polym. Sci. Pol. Chem. 2006, 44, 5161.
B. L. Frey, M. C. Robert, S. C. Weibel, in Handbook of Vibrational Spectroscopy, Vol. 2 (Eds.: J. Chalmers, P. R. Griffiths), John Wiley and Sons, New York, 2002, pp. 1042.
M. E. Buck, J. Zhang, D. M. Lynn, Adv. Mater. 2007, 19, 3951.
A. N. Zelikin, J. F. Quinn, F. Caruso, Biomacromolecules 2006, 7, 27-30
U.S. Pat. No. 4,451,619
U.S. Pat. No. 5,486,358
U.S. Pat. No. 5,567,422
U.S. Pat. No. 5,741,620
U.S. Pat. No. 6,291,216
U.S. Pat. No. 5,837,751
U.S. Pat. No. 6,245,922
U.S. Pat. No. 4,981,933
U.S. Pat. No. 5,262,484
U.S. Pat. No. 7,332,546
U.S. Pat. No. 6,379,952
U.S. Pat. No. 4,485,236
U.S. Pat. No. 5,013,795
U.S. Pat. No. 4,639,286
U.S. Pat. No. 4,871,824
U.S. Pat. No. 7,368,296
U.S. Pat. No. 5,336,742
U.S. Pat. No. 5,419,806
U.S. Pat. No. 4,304,705
U.S. Pat. No. 5,081,197
U.S. Pat. No. 5,091,489
U.S. Pat. No. 5,039,813
U.S. Patent Application Publication No. 2006/0068204
U.S. Patent Application Publication No. 2002/0150951
U.S. Patent Application Publication No. 2001/0025015

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An ultrathin film comprising an azlactone functionalized first polymer and a second polymer selected from the group consisting of a primary amine functionalized polymer, an alcohol functionalized polymer and a thiol functionalized polymer.

2. The ultrathin film of claim 1, wherein the azlactone functionalized first polymer has a formula FX1:

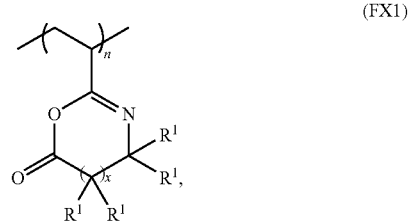

(FX1)

wherein x is an integer 0, 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, ester groups, all of which may be substituted or unsubstituted.

3. The ultrathin film of claim 2, wherein the azlactone functionalized first polymer is selected from the group consisting of:

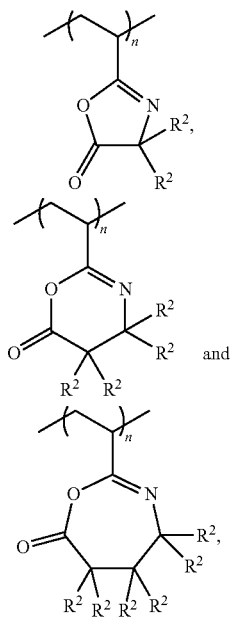

wherein each $R^2$ is independently selected from the group consisting of: a hydrogen, $C_1$-$C_{10}$ alkyl groups, $C_1$-$C_{10}$ alkenyl groups, $C_1$-$C_{10}$ alkynyl groups, $C_3$-$C_{10}$ cycloalkyl groups, $C_3$-$C_{10}$ heterocyclic groups, $C_6$-$C_{12}$ aryl groups, $C_5$-$C_{12}$ heteroaryl groups, all of which may be substituted or unsubstituted.

4. The ultrathin film of claim 1 wherein the azlactone functionalized first polymer is selected from the group consisting of: poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly(2-vinyl-4-methyl-4-phenyl-2-oxazolin-5-one), poly(2-isopropenyl-4-benzyl- 4-methyl-2-oxazolin-5-one), poly(2-vinyl-4,4-dimethyl-1,3-oxazin-6-one), any copolymer of these and any combination of these.

5. The ultrathin film of claim 1, wherein the second polymer is a primary amine functionalized polymer selected from the group consisting of poly(ethylene imine); polylysine; polyallylamine; poly(amidoamine) dendrimers; linear, hyperbranched, and dendritic polymers functionalized with primary amines; any combination of these; and any copolymers of these.

6. The ultrathin film of claim 1, wherein the second polymer is an alcohol functionalized polymer selected from the group consisting of: polyvinyl alcohol; poly hydroxy ethyl methacrylate; dendrimers, linear, hyperbranched, and dendritic polymers functionalized with hydroxy groups; any combination of these; and any copolymers of these.

7. The ultrathin film of claim 1, wherein the second polymer is a thiol functionalized polymer selected from the group consisting of: poly(methacrylic acid) functionalized with cysteamine; dendrimers, linear, hyperbranched, and dendritic polymers functionalized with thiol groups; any copolymer of these; and any combination of these.

8. The ultrathin film of claim 1, wherein at least a portion of the azlactone functionalized first polymer undergoes a chemical reaction with at least a portion of the second polymer.

9. The ultrathin film of claim 8, wherein the chemical reaction is a cross-linking reaction.

10. The ultrathin film of claim 8, wherein the chemical reaction is a covalent bond forming reaction.

11. The ultrathin film of claim 1, further comprising a non-polymeric primary amine.

12. The ultrathin film of claim 11, wherein the non-polymeric primary amine is selected from the group consisting of hydrophobic amines, hydrophilic amines, amphiphilic amines, lipophilic amines and any combination of these.

13. The ultrathin film of claim 11, wherein the non-polymeric primary amine is selected from the group consisting of: alkyl amines, alkenyl amines, aromatic amines, an Arginine-Glycine-Aspartic acid sequence modified with a primary amine linker and any combination of these.

14. The ultrathin film of claim 11, wherein the non-polymeric primary amine is an alkyl amine having from 1 to 20 carbon atoms.

15. The ultrathin film of claim 11, wherein the non-polymeric primary amine is selected from the group consisting of: hexylamine, decylamine, propylamine and any combination of these.

16. The ultrathin film of claim 11, wherein the non-polymeric primary amine is selected from the group consisting of: amino sugars, amino alcohols, amino polyols and any combination of these.

17. The ultrathin film of claim 11, wherein the non-polymeric primary amine is selected from the group consisting of: glucamine, amine functionalized polyethylene glycol, amine functionalized ethylene glycol oligomers and any combination of these.

18. The ultrathin film of claim 11, wherein at least a portion of the azlactone functionalized first polymer undergoes a chemical reaction with the non-polymeric primary amine.

19. The ultrathin film of claim 18, wherein the chemical reaction is a covalent bond forming reaction.

20. The ultrathin film of claim 1, wherein the film is formed in a layer-by-layer process.

21. The ultrathin film of claim 1, wherein the film comprises a single bilayer.

22. The ultrathin film of claim 21, wherein the bilayer comprises a layer of the second polymer and a layer of the azlactone functionalized first polymer.

23. The ultrathin film of claim 1, wherein the film comprises multiple bilayers.

24. The ultrathin film of claim 23 wherein each bilayer comprises a layer of the second polymer and a layer of the azlactone functionalized first polymer.

25. The ultrathin film of claim 1, wherein the film has a thickness selected from the range of 1 nm to 100 μm.

26. The ultrathin film of claim 1, wherein the film is attached to a surface.

27. The ultrathin film of claim 26, wherein the surface includes a material selected from the group consisting of inorganic surface, glass, silicon, metals, gold, stainless steel, organic surfaces, proteinaceous surfaces, and teflon.

28. The ultrathin film of claim 25, wherein the surface includes a sacrificial layer or is the surface of a sacrificial substrate.

29. The ultrathin film of claim 1, wherein the film is a freestanding film.

30. The ultrathin film of claim 1, further comprising a catalyst.

31. The ultrathin film of claim 30, wherein the catalyst is 1,8-diazabicyclo[5,4,0]undec-7-ene.

32. A hydrophilic ultrathin film comprising: an azlactone functionalized first polymer; a second polymer selected from the group consisting of a primary amine functionalized polymer, an alcohol functionalized polymer and a thiol functionalized polymer; and a non-polymeric hydrophilic primary amine; wherein a portion of the azlactone functional groups of the azlactone functionalized first polymer are reacted with at least a portion of the primary amine, alcohol, or thiol functional groups of the second polymer and at least a portion of the azlactone functional groups of the azlactone functionalized first polymer are reacted with at least a portion of the non-polymeric hydrophilic primary amine.

33. A hydrophobic ultrathin film comprising: an azlactone functionalized first polymer; a second polymer selected from the group consisting of a primary amine functionalized polymer, an alcohol functionalized polymer and a thiol functionalized polymer; and a non-polymeric hydrophobic primary amine; wherein a portion of the azlactone functional groups of the azlactone functionalized first polymer are reacted with at least a portion of the primary amine, alcohol, or thiol functional groups of the second polymer and at least a portion of the azlactone functional groups of the azlactone functionalized first polymer are reacted with at least a portion of the non-polymeric hydrophobic primary amine.

34. A mixed hydrophilic-hydrophobic ultrathin film comprising: an azlactone functionalized first polymer; a second polymer selected from the group consisting of a primary amine functionalized polymer, an alcohol functionalized polymer and a thiol functionalized polymer; a non-polymeric hydrophilic primary amine; and a non-polymeric hydrophobic amine; wherein a portion of the azlactone functional groups of the azlactone functionalized first polymer are reacted with at least a portion of the primary amine, alcohol, or thiol functional groups of the second polymer, at least a portion of the azlactone functional groups of the azlactone functionalized first polymer are reacted with at least a portion of the non-polymeric hydrophilic primary amine and at least a portion of the azlactone functional groups of the azlactone functionalized first polymer are reacted with at least a portion of the non-polymeric hydrophobic primary amine.

35. A method of making an ultrathin film, the method comprising the steps of:
   a. exposing a surface to a first solution comprising a first polymer selected from the group consisting of a primary amine functionalized polymer, an alcohol functionalized polymer and a thiol functionalized polymer; and
   b. exposing the surface to a second solution comprising an azlactone functionalized second polymer.

36. The method of claim 35, wherein, in step a, the first polymer molecules adhere to at least a portion of the surface.

37. The method of claim 35, wherein, in step b, azlactone functionalized second polymer molecules react with at least a portion of the first polymer molecules.

38. The method of claim 35, further comprising repeating one or more times steps a and b.

39. The method of claim 38, wherein, in a repeated step a, first polymer molecules react with at least a portion of the azlactone functionalized second polymer molecules.

40. The method of claim 35, further comprising a rinsing step between steps a and b of rinsing with a substance substantially free of primary amine, alcohol, thiol and azlactone groups.

41. The method of claim 40 wherein the rinsing step between steps a and b comprises rinsing with an organic solvent.

42. The method of claim 35, further comprising a rinsing step after step b of rinsing with a substance substantially free of primary amine, alcohol, thiol and azlactone groups.

43. The method of claim 42 wherein the rinsing step after step b comprises rinsing with an organic solvent.

44. The method of claim 35, wherein the azlactone functionalized second polymer has a formula FX1:

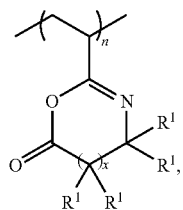

(FX1)

wherein x is an integer 0, 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, ester groups, all of which may be substituted or unsubstituted.

45. The method of claim 35, wherein the azlactone functionalized second polymer is selected from the group consisting of:

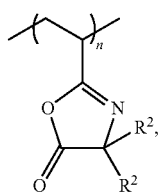

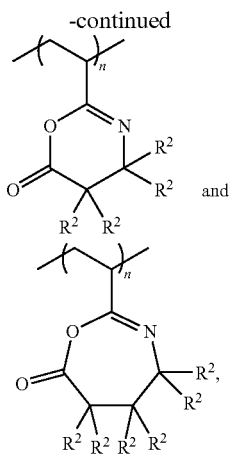

wherein each $R^2$ is independently selected from the group consisting of: a hydrogen, $C_1$-$C_{10}$ alkyl groups, $C_1$-$C_{10}$ alkenyl groups, $C_1$-$C_{10}$ alkynyl groups, $C_3$-$C_{10}$ cycloalkyl groups, $C_3$-$C_{10}$ heterocyclic groups, $C_6$-$C_{12}$ aryl groups, $C_5$-$C_{12}$ heteroaryl groups, all of which may be substituted or unsubstituted.

46. The method of claim 35, wherein the azlactone functionalized second polymer is selected from the group consisting of: poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly(2-vinyl-4-methyl-4-phenyl-2-oxazolin-5-one), poly(2-isopropenyl-4-benzyl-4-methyl-2-oxazolin-5-one), poly(2-vinyl-4,4-dimethyl-1,3-oxazin-6-one), any copolymer of these and any combination of these.

47. The method of claim 35, wherein the first polymer is a primary amine functionalized polymer selected from the group consisting of: poly(ethylene imine); polylysine; polyallylamine; poly(amidoamine) dendrimers; linear, hyperbranched, and dendritic polymers functionalized with primary amines; any combination of these; and any copolymers of these.

48. The method of claim 35, wherein the first polymer is an alcohol functionalized polymer selected from the group consisting of polyvinyl alcohol; poly hydroxy ethyl methacrylate; dendrimers, linear, hyperbranched, and dendritic polymers functionalized with hydroxy groups; any combination of these; and any copolymers of these.

49. The method of claim 35, wherein the first polymer is a thiol functionalized polymer selected from the group consisting of: poly(methacrylic acid) functionalized with cysteamine; dendrimers, linear, hyperbranched, and dendritic polymers functionalized with thiol groups; any copolymer of these; and any combination of these.

50. The method of claim 35, further comprising the step of exposing the surface to a non-polymeric primary amine containing solution.

51. The method of claim 50, wherein the non-polymeric primary amine is selected from the group consisting of hydrophobic amines, hydrophilic amines, amphiphilic amines, lipophilic amines and any combination of these.

52. The method of claim 50, wherein the non-polymeric primary amine is selected from the group consisting of: alkyl amines, alkenyl amines, aromatic amines, Arginine-Glycine-Aspartic acid, and any combination of these.

53. The method of claim 50, wherein the non-polymeric primary amine is an alkyl amine having from 1 to 20 carbon atoms.

54. The method of claim 50, wherein the non-polymeric primary amine is selected from the group consisting of: hexylamine, decylamine, propylamine and any combination of these.

55. The method of claim 50, wherein the non-polymeric primary amine is an Arginine-Glycine-Aspartic acid sequence modified with a primary amine linker.

56. The method of claim 50, wherein the non-polymeric primary amine is selected from the group consisting of: amino sugars, amino alcohols, amino polyols and any combination of these.

57. The method of claim 50, wherein the non-polymeric primary amine is selected from the group consisting of: glucamine, amine functionalized polyethylene glycol, amine functionalized ethylene glycol oligomers and any combination of these.

58. The method of claim 35, wherein the surface comprises an inorganic surface, a glass surface, a silicon surface, a metal surface, a gold surface, a stainless steel surface, an organic surface, a proteinaceous surface, and a teflon surface.

59. The method of claim 35, wherein the surface comprises a sacrificial layer or is the surface of a sacrificial substrate.

60. The method of claim 59, further comprising the step of lifting the ultrathin film from the surface by dissolving the sacrificial layer or the sacrificial substrate.

61. The method of claim 35, further comprising the step of mechanically lifting the ultrathin film from the surface.

62. The method of claim 61, wherein the lifting step comprises mechanical removal of the ultrathin film from the surface.

63. A method for preventing cell or protein adhesion to a surface, the method comprising the steps of:
   a. exposing a surface to a first solution comprising a first polymer selected from the group consisting of a primary amine functionalized polymer, an alcohol functionalized polymer and a thiol functionalized polymer; and
   b. exposing the surface to a second solution comprising an azlactone functionalized second polymer; and
   c. exposing the surface to a third solution comprising a non-polymeric hydrophilic primary amine.

64. The method of claim 63, wherein the non-polymeric hydrophilic primary amine is selected from the group consisting of glucamine, amine functionalized polyethylene glycol, amine functionalized ethylene glycol oligomers and any combination of these.

65. The method of claim 63, further comprising a rinsing step between steps a and b of rinsing with a substance substantially free of primary amine, alcohol, thiol and azlactone groups.

66. The method of claim 65 wherein the rinsing step between steps a and b comprises rinsing with an organic solvent.

67. The method of claim 63, further comprising a rinsing step between steps b and c of rinsing with a substance substantially free of primary amine, alcohol, thiol and azlactone groups.

68. The method of claim 67 wherein the rinsing step between steps b and c comprises rinsing with an organic solvent.

69. The method of claim 63, further comprising repeating one or more times steps a and b before step c.

70. A method for promoting cell or protein adhesion to a surface, the method comprising the steps of:
   a. exposing a surface to a first solution comprising a first polymer selected from the group consisting of a primary amine functionalized polymer, an alcohol functionalized polymer and a thiol functionalized polymer; and
   b. exposing the surface to a second solution comprising an azlactone functionalized second polymer; and
   c. exposing the surface to a cell or protein.

71. The method of claim 70 further comprising exposing the surface to a third solution comprising an Arginine-Glycine-Aspartic acid sequence modified with a primary amine linker before step c.

72. The method of claim 70 further comprising exposing the surface to a third solution comprising a non-polymeric hydrophobic primary amine before step c.

73. The method of claim 72, wherein the non-polymeric hydrophobic primary amine is selected from the group consisting of: Arginine-Glycine-Aspartic acid, hexylamine, decylamine, propylamine and any combination of these.

74. The method of claim 70, further comprising a rinsing step between steps a and b of rinsing with a substance substantially free of primary amine, alcohol, thiol and azlactone groups.

75. The method of claim 74 wherein the rinsing step between steps a and b comprises rinsing with an organic solvent.

76. The method of claim 70, further comprising a rinsing step between steps b and c of rinsing with a substance substantially free of primary amine, alcohol, thiol and azlactone groups.

77. The method of claim 76 wherein the rinsing step between steps b and c comprises rinsing with an organic solvent.

78. The method of claim 70, further comprising repeating one or more times steps a and b before step c.

* * * * *

UNITED STATES PATENT AND TRADEMARK OFFICE
CERTIFICATE OF CORRECTION

| | | |
|---|---|---|
| PATENT NO. | : 8,071,210 B2 | Page 1 of 1 |
| APPLICATION NO. | : 12/248788 | |
| DATED | : December 6, 2011 | |
| INVENTOR(S) | : David M. Lynn, Maren E. Buck and Jingtao Zhang | |

It is certified that error appears in the above-identified patent and that said Letters Patent is hereby corrected as shown below:

In the Specification:

On the cover page at (73) Assignee, please replace "Wiscousin Alumni Research Foundation" with -- Wisconsin Alumni Research Foundation --

Signed and Sealed this
Thirty-first Day of January, 2012

David J. Kappos
*Director of the United States Patent and Trademark Office*